(12) United States Patent
Lu

(10) Patent No.: US 11,082,242 B2
(45) Date of Patent: Aug. 3, 2021

(54) TRANSISTOR-BASED PHYSICALLY UNCLONABLE FUNCTION

(71) Applicant: Taiwan Semiconductor Manufacturing Co., Ltd., Hsinchu (TW)

(72) Inventor: Shih-Lien Linus Lu, Hsinchu (TW)

(73) Assignee: Taiwan Semiconductor Manufacturing Co., Ltd.

( * ) Notice: Subject to any disclaimer, the term of this patent is extended or adjusted under 35 U.S.C. 154(b) by 128 days.

(21) Appl. No.: 16/415,451

(22) Filed: May 17, 2019

(65) Prior Publication Data
US 2020/0366507 A1 Nov. 19, 2020

(51) Int. Cl.
*H04L 9/32* (2006.01)
*H03K 19/0944* (2006.01)

(52) U.S. Cl.
CPC ....... *H04L 9/3278* (2013.01); *H03K 19/0944* (2013.01)

(58) Field of Classification Search
CPC .......................... H03K 19/0944; H04L 9/3278
See application file for complete search history.

(56) References Cited

U.S. PATENT DOCUMENTS

| 8,854,866 | B2* | 10/2014 | Huber | ............ | H04L 9/0866 |
| | | | | | 365/154 |
| 10,483,971 | B1* | 11/2019 | Lu | ............ | G06F 30/33 |

| 2018/0183613 | A1 | 6/2018 | Dafali et al. | |
| 2020/0020364 | A1* | 1/2020 | Tsai | ............ G11C 7/08 |
| 2020/0099540 | A1* | 3/2020 | Lu | ............ H04L 9/3278 |

FOREIGN PATENT DOCUMENTS

| DE | 102010024622 A1 | 11/2011 |
| JP | 2017126396 A | 7/2017 |
| KR | 20180050276 A | 5/2018 |

OTHER PUBLICATIONS

J. Guajardo, S. S. Kumar, G. J. Schrijen, P. Tuyls. PGS Intrinsic PUFs and Their Use for IP Protection. Cryptographic Hardware and Embedded Systems. 2007. 63-80.

* cited by examiner

*Primary Examiner* — Kurtis R Bahr
(74) *Attorney, Agent, or Firm* — Sterne, Kessler, Goldstein & Fox P.L.L.C.

(57) ABSTRACT

An integrated circuit is fabricated using a semiconductor fabrication process. One or more uncontrollable random physical processes in the semiconductor fabrication process can cause small differences between the integrated circuit and other similarly designed integrated circuit. These small differences can cause transistors of the integrated circuit to have different threshold voltages. The integrated circuit can use these different threshold voltages to quantify its physical uniqueness to differentiate itself from other integrated circuits similarly designed and fabricated by the semiconductor fabrication process.

18 Claims, 17 Drawing Sheets

US 11,082,242 B2

TRANSISTOR-BASED PHYSICALLY UNCLONABLE FUNCTION

BACKGROUND

An integrated circuit represents a collection of electronic circuits that are formed onto a semiconductor substrate, such as a silicon crystal to provide an example, using a semiconductor fabrication process. Often times, manufacturing variations and/or misalignment tolerances present within the semiconductor fabrication process can cause integrated circuits fabricated by the semiconductor fabrication process to differ from each other. For example, uncontrollable random physical processes in the semiconductor fabrication process can cause small differences, such as differences in doping concentrations, oxide thicknesses, channel lengths, structural widths, and/or parasitics to provide some examples, in the integrated circuits. These small differences are maintained within process limits of the semiconductor fabrication process and usually do not affect the proper function of the integrated circuits. However, these small differences cause each of the integrated circuits to be physically unique with no two integrated circuits being identical. Physical unclonable functions (PUFs) use this physical uniqueness to differentiate integrated circuits from each other. The PUFs represent challenge-response mechanisms in which mapping between challenges and their corresponding responses are dependent on the complex and variable nature of the physical material used to fabricate the integrated circuits. When the integrated circuits are presented with the challenges, the integrated circuits generate random responses that depend on the physical properties of the integrated circuits themselves. When queried with the same challenge multiple times, the integrated circuits generate similar responses.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
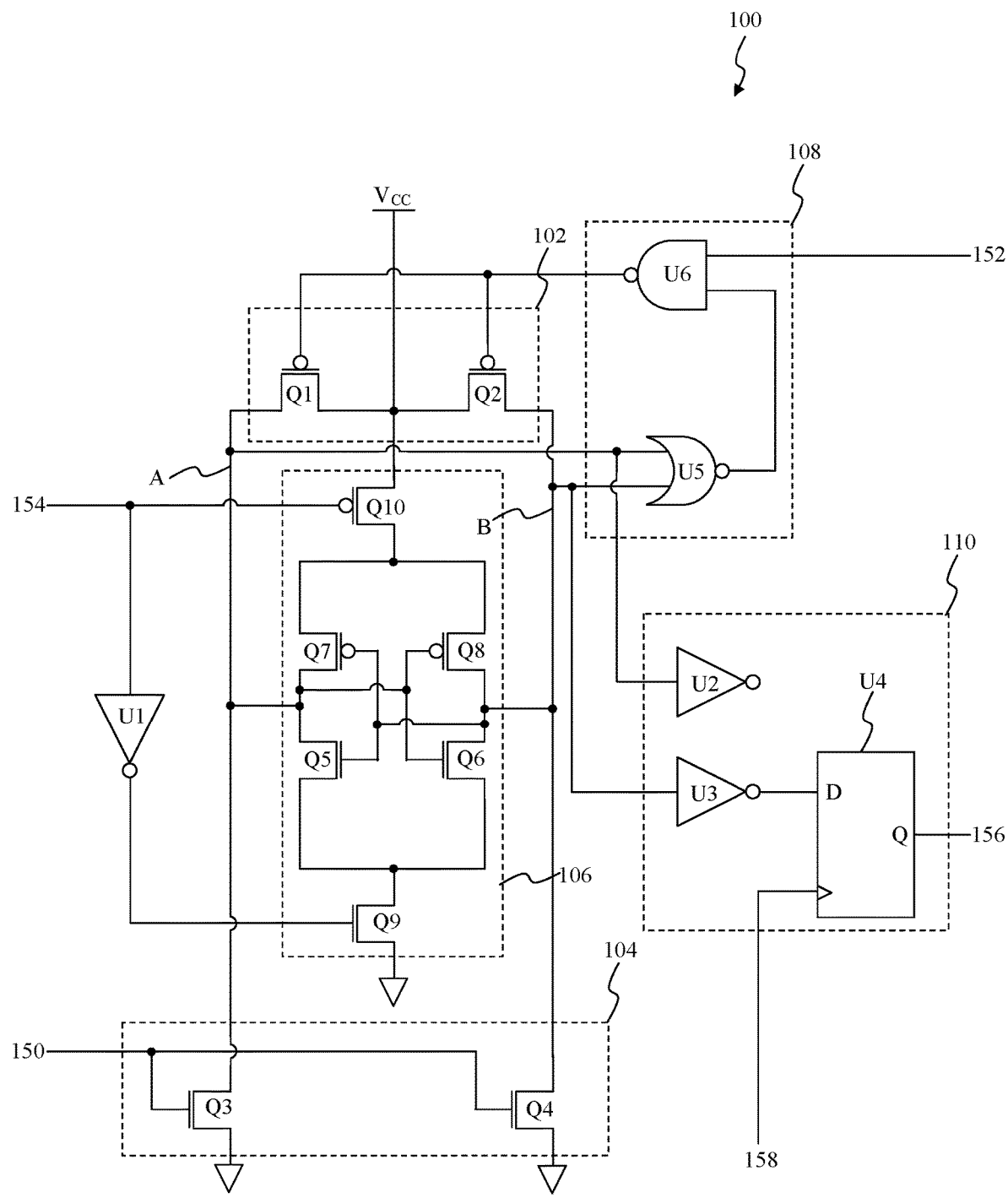
FIG. 1 illustrates a block diagram of first physical unclonable function (PUF) circuitry according to an exemplary embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is does not in itself dictate a relationship between the various embodiments and/or configurations discussed.

Overview

An integrated circuit is fabricated using a semiconductor fabrication process. One or more uncontrollable random physical processes in the semiconductor fabrication process can cause small differences between the integrated circuit and other similarly designed integrated circuit. These small differences can cause transistors of the integrated circuit to have different threshold voltages. The integrated circuit can use these different threshold voltages to quantify its physical uniqueness to differentiate itself from other integrated circuits similarly designed and fabricated by the semiconductor fabrication process. These different threshold voltages, as described in further detail below, are less dependent upon temperate when compared to other physical unclonable functions (PUFs). For example, the transistors of the integrated circuit used to implement the PUFs as described in further detail below are situated relatively close to each other to operate under similar operating conditions, such as stress, temperature, humidity, and/or electromagnetic interference to provide some examples. In contrast, other PUFs often change their behavior in response to changes in the operating conditions. For example, these other PUFs can exhibit a stable state at one operation condition which may change to another state in response to a change in the operating conditions.

Exemplary First Physical Unclonable Function (PUF) Circuitry

FIG. 1 illustrates a block diagram of first physical unclonable function (PUF) circuitry according to an exemplary embodiment of the present disclosure. In the exemplary embodiment illustrated in FIG. 1, PUF circuitry 100 can be fabricated using a semiconductor fabrication process. Often times, manufacturing variations and/or misalignment tolerances present within the semiconductor fabrication process can cause the PUF circuitry 100 to differ from other PUF circuitry similarly designed and fabricated by the semiconductor fabrication process. For example, uncontrollable random physical processes in the semiconductor fabrication process can cause small differences, such as differences in doping concentrations, oxide thicknesses, channel lengths, structural widths, and/or parasitics to provide some examples, between these PUF circuitry. However, these small differences cause each of these PUF circuitry to be physically unique with no two PUF circuitry being identical. As described in further detail below, these small differences can cause transistors of the PUF circuitry 100 to have different threshold voltages. The PUF circuitry 100 can use these different threshold voltages to quantify its physical uniqueness to differentiate itself from other PUF circuitry similarly designed and fabricated by the semiconductor fabrication process. As illustrated in FIG. 1, the PUF circuitry 100 includes a difference generator circuit 102, a pre-discharge circuit 104, a sense amplifier 106, a self-timed timing circuit 108, a storage circuit 110, and a logical INVERTER gate U1. For the purposes of this discussion, the term "circuitry" shall be understood to include an analog circuit, a digital circuit, state machine logic, other structural electronic hardware, or a combination thereof.

In the exemplary embodiment illustrated in FIG. 1, the difference generator circuit 102 includes a p-type metal-oxide-semiconductor (PMOS) transistor Q1 and a PMOS transistor Q2. The uncontrollable random physical processes in the semiconductor fabrication process as described above can cause the doping concentrations, oxide thicknesses, channel lengths, structural widths, and/or parasitics to provide some examples to differ between the PMOS transistor Q1 and the PMOS transistor Q2. These differences can cause differences between threshold voltages of the PMOS transistor Q1 and the PMOS transistor Q2. For example, these differences can cause a first threshold voltage ($V_T$) of the PMOS transistor Q1 to be greater than a second $V_T$ of the PMOS transistor Q2. In this example, the greater first $V_T$ needed to activate, or turn-on, the PMOS transistor Q1 results in a slower relative speed for the PMOS transistor Q1 to activate, or turn-on, when compared to the PMOS transistor Q2. As a result, PMOS transistor Q1 can be characterized as being weaker when compared to the PMOS transistor Q2. As another example, these differences can cause the first $V_T$ of the PMOS transistor Q1 to be less than the second $V_T$ of the PMOS transistor Q2. In this example, the lesser first $V_T$ of the PMOS transistor Q1 results in a faster relative speed for the PMOS transistor Q1 to activate, or turn-on, when compared to the PMOS transistor Q2. As a result, the PMOS transistor Q1 can be characterized as being stronger when compared to the PMOS transistor Q2.

The pre-discharge circuit 104, when activated, discharges the difference generator circuit 102 to be a first logical value, such as a logical zero. For example, the pre-discharge circuit 104 discharges charge stored within parasitic capacitances of the PMOS transistor Q1, the PMOS transistor Q2, and/or signal pathways between the difference generator circuit 102 and the pre-discharge circuit 104. In the exemplary embodiment illustrated in FIG. 1, the pre-discharge circuit 104 includes a n-type metal-oxide-semiconductor (NMOS) transistor Q3 and an NMOS transistor Q4. As illustrated in FIG. 1, the NMOS transistor Q3, when activated in response to a first control signal 150 being a second logical value, such as a logical one, discharges the parasitic capacitances of the PMOS transistor Q1 and/or a signal pathway between the PMOS transistor Q1 and the NMOS transistor Q3. Similarly, the NMOS transistor Q4, when activated in response to the first control signal 150 being at the second logical value, discharges the parasitic capacitances of the PMOS transistor Q2 and/or a signal pathway between the PMOS transistor Q2 and the NMOS transistor Q4 such at a first voltage V1 at the circuit node A and a second voltage V2 at the circuit node B are at the first logical value, such as the logical zero.

The sense amplifier 106 stores logical values indicating whether the PMOS transistor Q1 or the PMOS transistor Q2 has a faster speed, namely, is stronger. In the exemplary embodiment illustrated in FIG. 1, the sense amplifier 106 includes NMOS transistor Q5, NMOS transistor Q6, PMOS transistor Q7, PMOS transistor Q8, NMOS transistor Q9, and PMOS transistor Q10. As described in further detail below, the PMOS transistor Q1 and the PMOS transistor Q2 discharge to generate voltages at a circuit node A and a circuit node B, respectively. The magnitude of these voltages at the circuit node A and the circuit node B depend up the speed of the PMOS transistor Q1 and the PMOS transistor Q2, respectively. For example, the magnitude of the first voltage V1 at the circuit node A is greater than the magnitude of the second voltage V2 at the circuit node B when the PMOS transistor Q1 has a faster speed, namely, is stronger, than the PMOS transistor Q2. As another example, the magnitude of the first voltage V1 at the circuit node A is less than the magnitude of the second voltage V2 at the circuit node B when the PMOS transistor Q1 has a slower speed, namely, is weaker, than the PMOS transistor Q2. In the exemplary embodiment illustrated in FIG. 1, the sense amplifier 106 can be deactivated by asserting the third control signal 154 to be the second logical value, such as the logical one, to deactivate the NMOS transistor Q9 and the PMOS transistor Q10. Similarly, the sense amplifier 106 can be activated by asserting a third control signal 154 to be the first logical value, such as the logical zero, to activate the NMOS transistor Q9 and the PMOS transistor Q10. The sense amplifier 106, when activated, stores the logical values indicating whether the first voltage V1 at the circuit node A is greater than or less than the second voltage V2 at the circuit node B. In the exemplary embodiment illustrated in FIG. 1, the logical INVERTER gate U1 performs a logical inversion operation on the third control signal 154 to provide a complementary control signal to the NMOS transistor Q9.

In the exemplary embodiment illustrated in FIG. 1, the NMOS transistor Q5 and the PMOS transistor Q7 are configured and arranged to form a first logical inverting circuit and the NMOS transistor Q6 and the PMOS transistor Q8 are configured and arranged to form a second logical inverting circuit. The first logical inverting circuit and the second logical inverting circuit represent a cross-coupled pair of logical inverting circuits with an output of the first logical inverting circuit being coupled to an input of the second logical inverting circuit and an input of the first logical inverting circuit being coupled to an output of the second logical inverting circuit. The first logical inverting circuit, when activated in response to the third control signal 154 being the first logical value, such as the logical one, stores a logical value associated with the circuit node A as illustrated in FIG. 1. Similarly, the second logical inverting circuit, when activated in response to the third control signal 154 being the first logical value, such as the logical one, stores the logical value associated with a circuit node B as illustrated in FIG. 1. In the exemplary embodiment illustrated in FIG. 1, the logical value associated with the circuit node A is a complement of the logical value associated with the circuit node B.

The self-timed timing circuit 108 controls charging and discharging of the PMOS transistor Q1 or the PMOS transistor Q2. In the exemplary embodiment illustrated in FIG. 1, the self-timed timing circuit 108 includes a logical NOR gate U5 and a logical NAND gate U6. Other logical gates, such as one or more logical AND gates, one or more logical OR gates, one or more logical INVERTER gates, one or more logical NAND gates, one or more logical NOR gates, and/or one or more logical XOR gates to provide some examples, can be used to implement the self-timed timing circuit 108 without departing from the spirit and scope of the present disclosure. In the exemplary embodiment illustrated in FIG. 1, the PMOS transistor Q1 and the PMOS transistor Q2 discharge to cause increasing voltages at a circuit node A and a circuit node B, respectively, as described above. In this exemplary embodiment, the logical NOR gate U5 provides the second logical value, such as the logical one, when the voltage at the circuit node A and the voltage at the circuit node B are not sufficient to trigger the logical NOR gate U5, for example, are at the first logical value, such as the logical zero. Otherwise, the logical NOR gate U5 provides the first logical value, such as the logical zero, when the voltage at the circuit node A or the voltage at the circuit node B are sufficient to trigger the logical NOR gate U5, for example, are at the second logical value, such as the logical one. The logical NAND gate U6 provides the first logical value, such as the logical zero, to activate the PMOS transistor Q1 and the PMOS transistor Q2 when an output of the logical NOR gate U5 and a second control signal 152 are at the second logical value, such as the logical one. Otherwise, the logical NAND gate U6 provides the second logical value, such as the logical one, to deactivate the PMOS transistor Q1 and the PMOS transistor Q2 when the output of the logical NOR gate U5 and the second control signal 152 are at the first logical value, such as the logical zero.

The storage circuit 110 reads the logical values stored within the sense amplifier 106 indicating whether the PMOS transistor Q1 or the PMOS transistor Q2 has a faster speed, namely, is stronger. In the exemplary embodiment illustrated in FIG. 1, the storage circuit 110 includes a logical INVERTER gate U2, a logical INVERTER gate U3, and a D flip-flop U4. Other logical gates, such as one or more logical AND gates, one or more logical OR gates, one or more logical INVERTER gates, one or more logical NAND gates, one or more logical NOR gates, and/or one or more logical XOR gates to provide some examples, and/or other flip-flops can be used to implement the storage circuit 110 without departing from the spirit and scope of the present disclosure. In the exemplary embodiment illustrated in FIG. 1, the logical INVERTER gate U3 performs a logical inversion operation on the logical value associated with the circuit node B that is stored within the sense amplifier 106. In this exemplary embodiment, the logical INVERTER gate U2 is not connected within the storage circuit 110. The logical INVERTER gate U2 provides an equivalent loading at the circuit node B as the logical INVERTER gate U3 provides at the circuit node A. The D flip-flop U4 reads the logical value stored associated with the circuit node B provided by the logical INVERTER gate U3 in response to a clocking signal 158 transitioning from the first logical value, such as the logical zero, to the second logical value, such as the logical one, to provide an PUF output 156 indicating whether the PMOS transistor Q1 or the PMOS transistor Q2 has a faster speed, namely, is stronger.

Figure 2A:
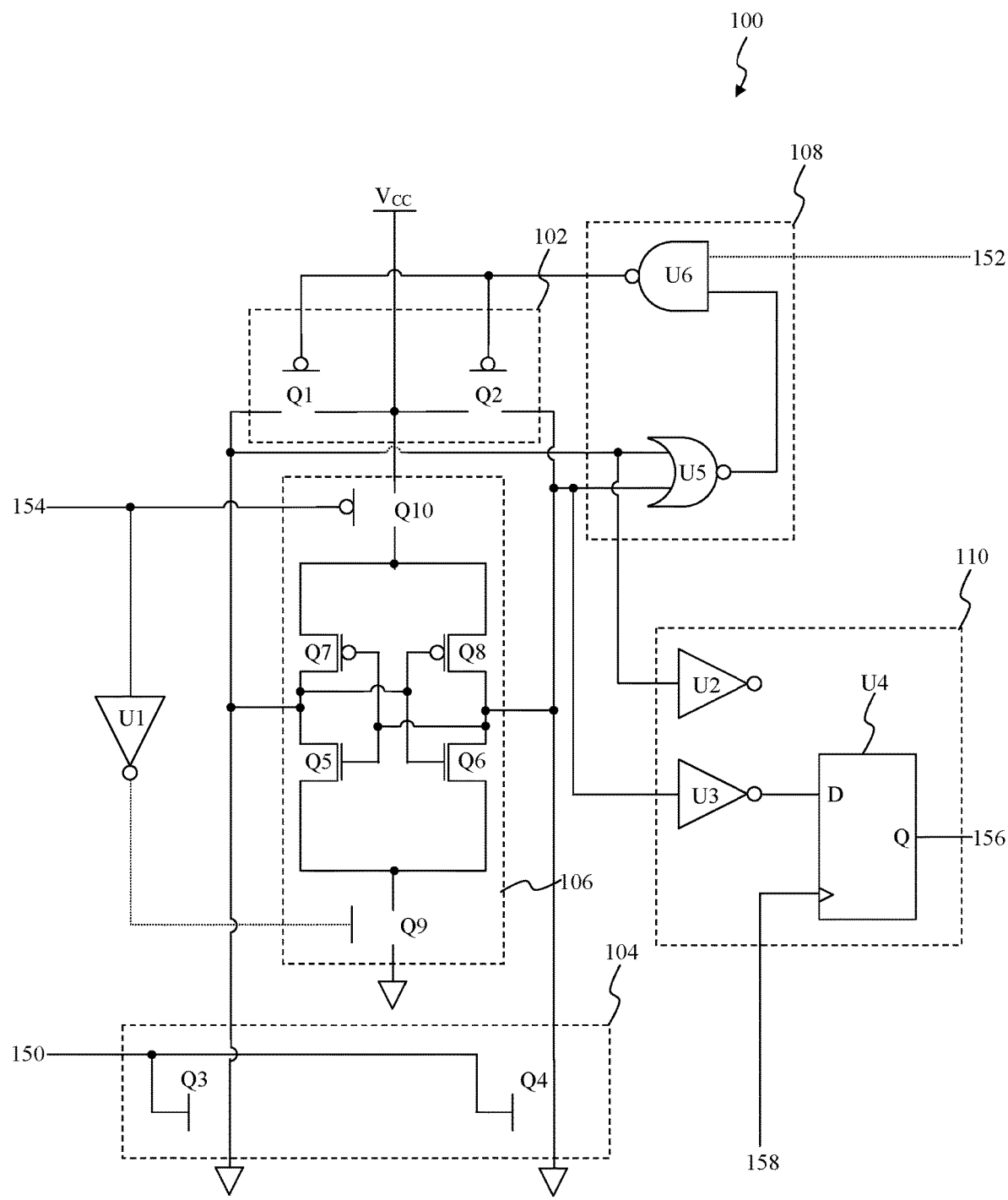
FIG. 2A through FIG. 2F illustrate exemplary operations of the first physical unclonable function (PUF) circuitry according to an exemplary embodiment of the present disclosure.
Figure 2B:
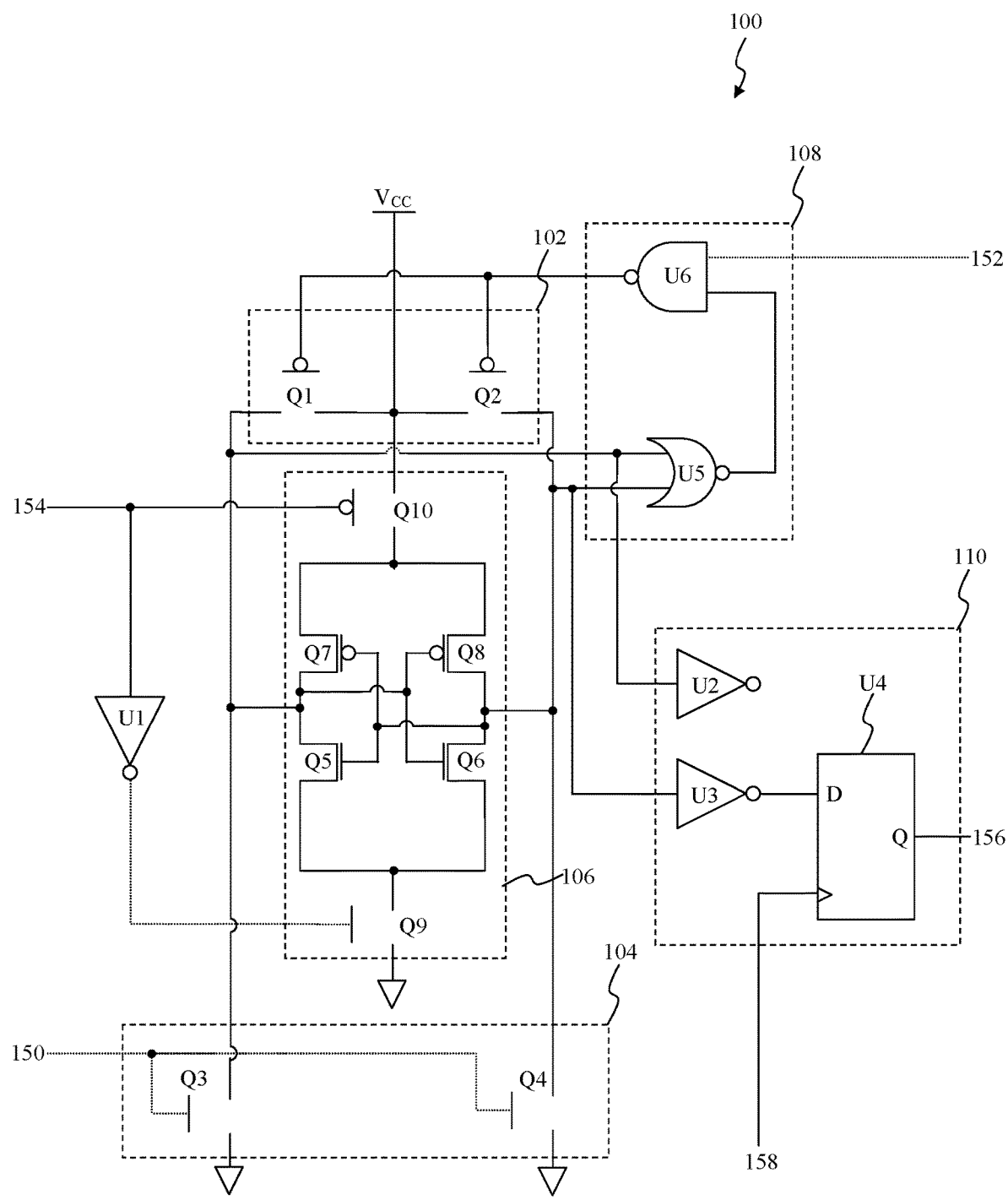
Figure 2C:
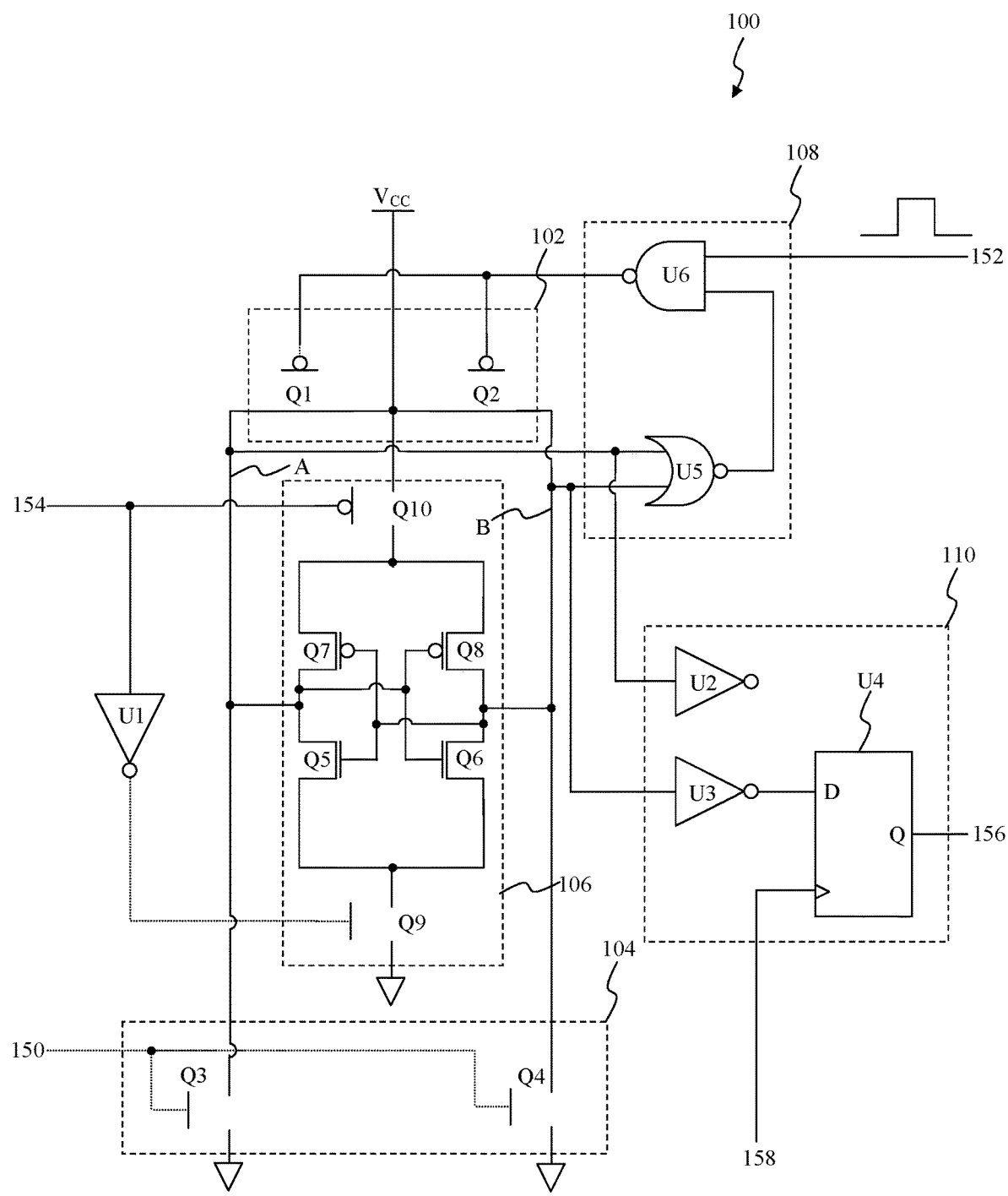
Figure 2D:
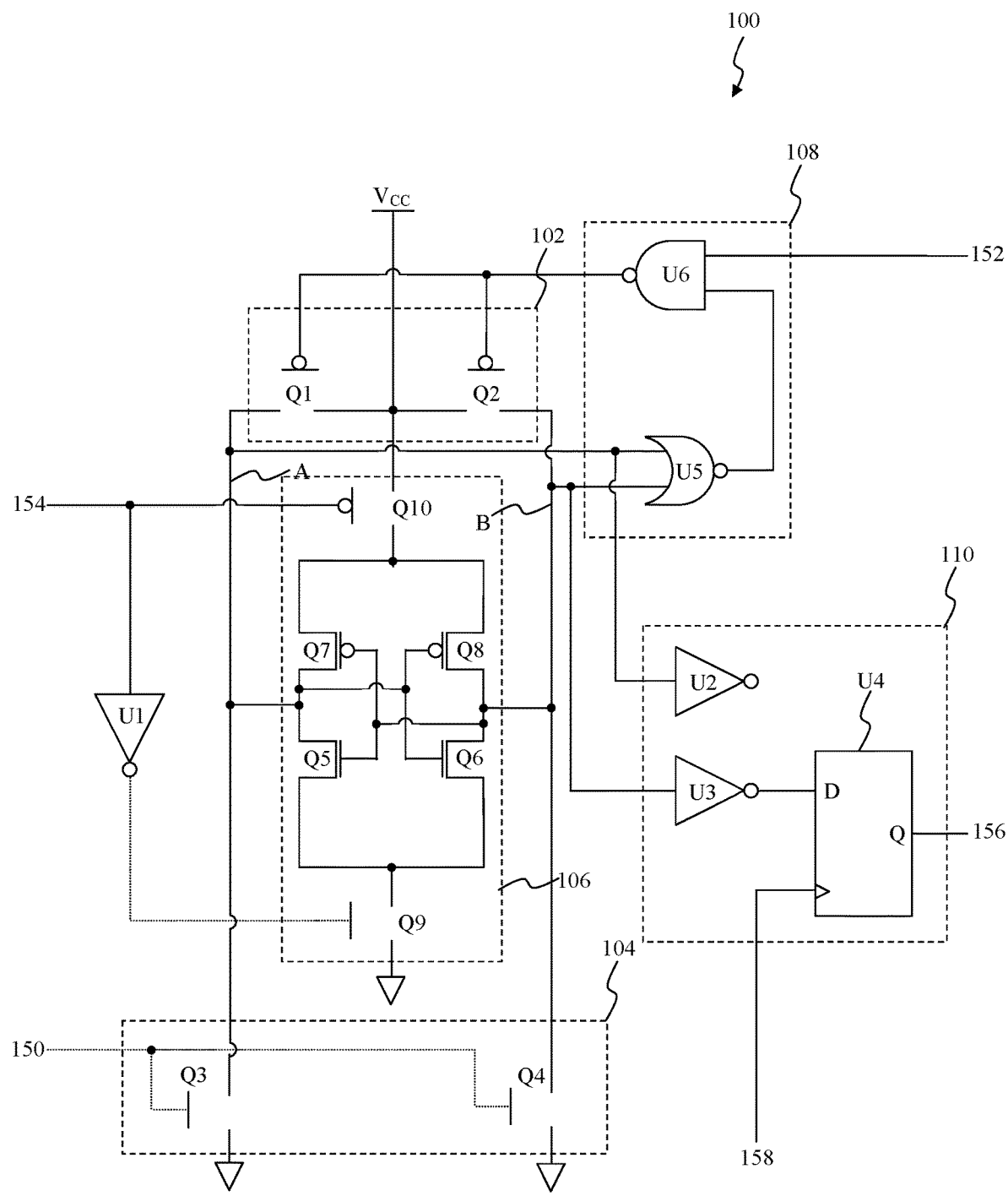
Figure 2E:
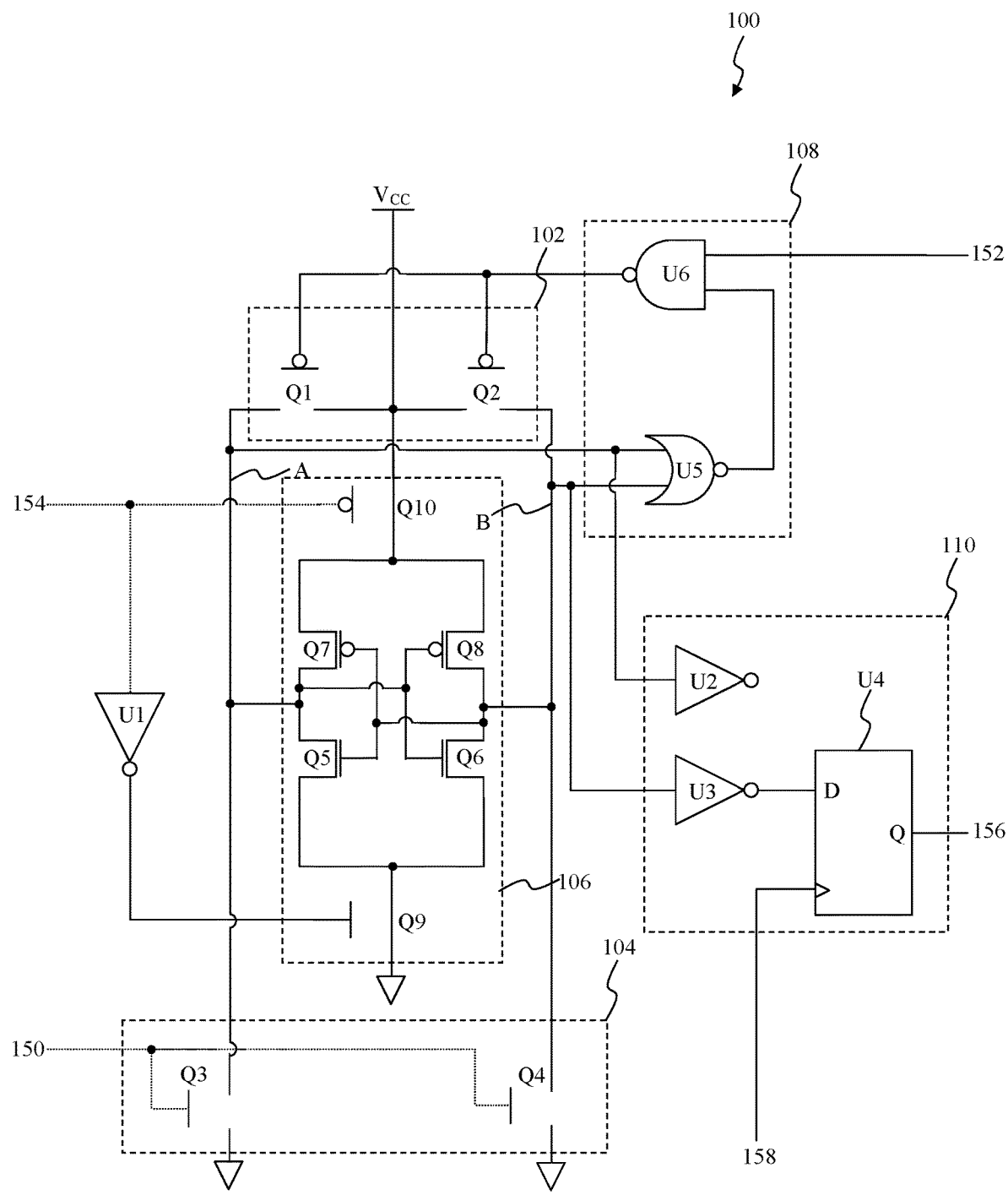
Figure 2F:
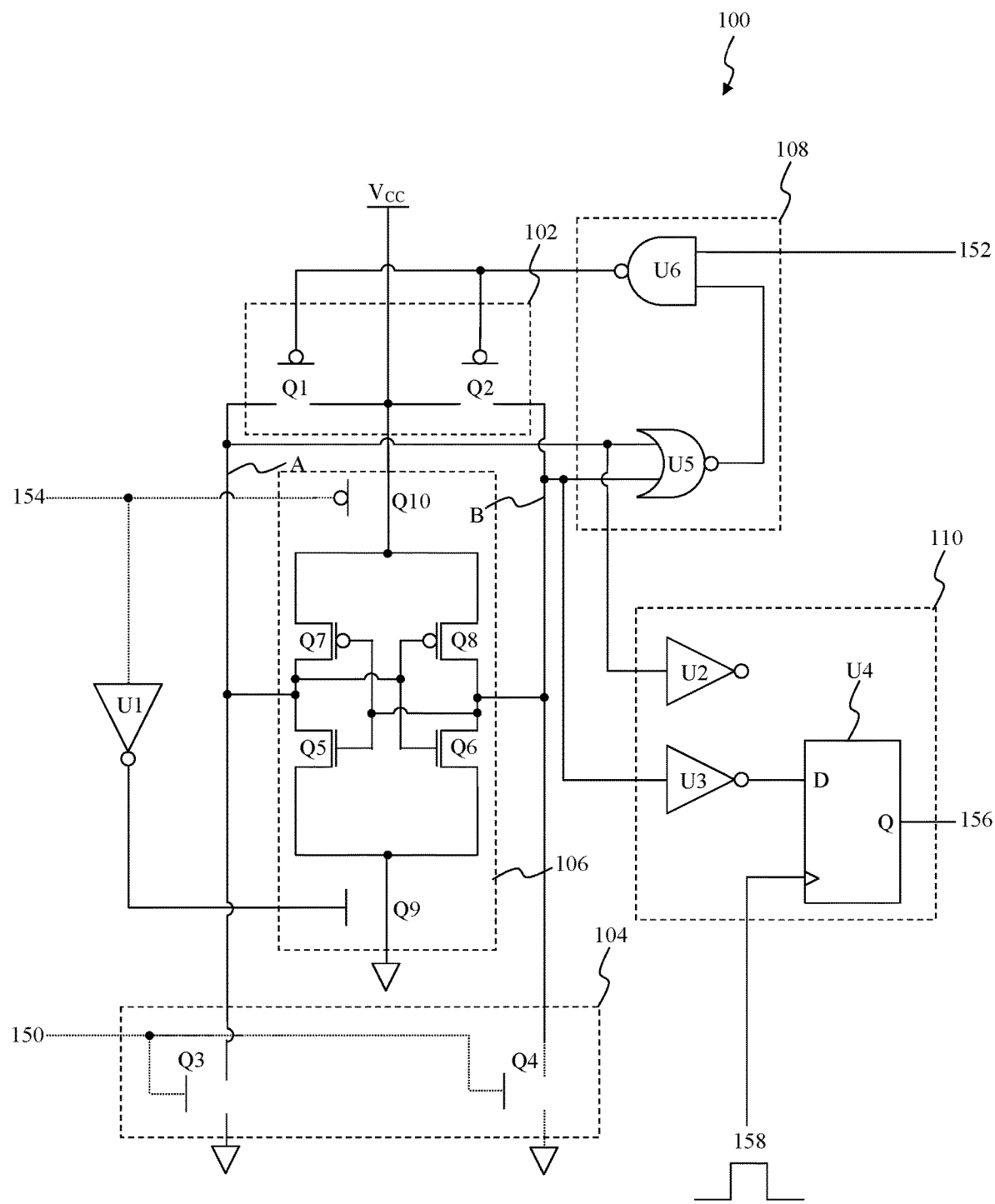

FIG. 2A through FIG. 2F illustrate exemplary operations of the first physical unclonable function (PUF) circuitry according to an exemplary embodiment of the present disclosure. As described in further detail below, the first control signal 150, the second control signal 152, and the third control signal 154 can be asserted, namely, switched from the first logical value, such as the logical zero, to the second logical value, such as the logical one, in various combinations to configure the PUF circuitry 100 to operate in different modes of operation. As described in further detail below, these modes of operation include a pre-discharge mode of operation as illustrated in FIG. 2A and FIG. 2B, a difference mode of operation as illustrated in FIG. 2C and FIG. 2D, and a sensing mode of operation as illustrated in FIG. 2E through FIG. 2F. Moreover, active transistors are shown having their sources and drains connected in FIG. 2A through FIG. 2F while inactive transistors are shown having no connection between their sources and drains in FIG. 2A through FIG. 2F. Additionally, logical values of the first control line 150, the second control line 152, and the third control signal 154, which are described in further detail below, are indicted in FIG. 2A through FIG. 2F. As described in further detail below, a dotted line represents these control signals being at the first logical value, such as the logical zero, while a solid line represents these control lines being at the second logical value, such as the logical one.

FIG. 2A and FIG. 2B illustrate operations of the PUF circuitry 100 in the pre-discharge mode of operation. As illustrated in FIG. 2A, the first control signal 150 is asserted, namely, switched from the first logical value, such as the logical zero, to the second logical value, such as the logical one. The second control signal 152 and the third control signal 154 remain at the first logical value, such as the logical zero, to configure the PUF circuitry 100 to operate in the pre-discharge mode of operation. In the exemplary embodiment illustrated in FIG. 1, the assertion of the first control signal 150 activates, namely, turns-on, the PMOS transistor Q3 and the PMOS transistor Q4 to discharge charge stored within parasitic capacitances of the PMOS transistor Q1, the PMOS transistor Q2, and/or signal pathways between the difference generator circuit 102 and the pre-discharge circuit 104 such at a first voltage V1 at the circuit node A and a second voltage V2 at the circuit node B are at the first logical value, such as the logical zero.

As illustrated in FIG. 2B, the first control signal 150 is de-asserted, namely, switched from the second logical value, such as the logical one, to the first logical value, such as the logical zero, to deactivate, namely, turn-off, the PMOS transistor Q3 and the PMOS transistor Q4 to configure the PUF circuitry 100 to cease operating in the pre-discharge mode of operation.

FIG. 2C and FIG. 2D illustrate operations of the PUF circuitry 100 in the difference mode of operation. As illustrated in FIG. 2C, the second control signal 152 is asserted, namely, switched from the first logical value, such as the logical zero, to the second logical value, such as the logical one to configure the PUF circuitry 100 to operate in the difference mode of operation. In an exemplary embodiment illustrated in FIG. 2C, a clocking signal can be used as the second control signal 152. The assertion of the second control signal 152 activates, namely, turns-on, the PMOS transistor Q1 and the PMOS transistor Q2. The PMOS transistor Q1 and the PMOS transistor Q2, when activated, source drain-to-source currents ($I_{DS}$) from the voltage source $V_{CC}$ to begin to provide a first voltage V1 at the circuit node A and a second voltage V2 at the circuit node B, respectively. As described above, the magnitude of the first voltage V1 at the circuit node A and the magnitude of the second voltage V2 at the circuit node B at an instance in time depend up the speed of the PMOS transistor Q1 and the PMOS transistor Q2, respectively. For example, the magnitude of the first voltage V1 at the circuit node A at the instance in time is greater than the magnitude of the second voltage V2 at the circuit node B the instance in time when the PMOS transistor Q1 has a faster speed, namely, is stronger, than the PMOS transistor Q2. As another example, the magnitude of the first voltage V1 at the circuit node A the instance in time is less than the magnitude of the second voltage V2 at the circuit node B the instance in time when the PMOS transistor Q1 has a slower speed, namely, is weaker, than the PMOS transistor Q2. As illustrated in FIG. 2D, the first voltage V1 at the circuit node A and the second voltage V2 at the circuit node B increase until the first voltage V1 at the circuit node A and/or the second voltage V2 at the circuit node B rises to a sufficient magnitude, referred to as a trigger voltage, to activate the self-timed timing circuit 108. In the exemplary embodiment illustrated in FIG. 2D, the trigger voltage can represent a threshold voltage of the logical NOR gate U5, an average of the first logical value and the second logical value, and/or any other suitable value.

As illustrated in FIG. 2D, the self-timed timing circuit 108, when activated, deactivates, namely, turns-off, the PMOS transistor Q1 and the PMOS transistor Q2. As described above in FIG. 1, the logical NOR gate U5 provides the first logical value, such as the logical zero, when the first voltage V1 at the circuit node A and/or second voltage V2 at the circuit node B are greater than or equal to the trigger voltage. The logical NAND gate U6 provides the second logical value, such as the logical one, to deactivate the PMOS transistor Q1 and the PMOS transistor Q2 when the logical NOR gate U5 provides the first logical value, such as the logical zero, to configure the PUF circuitry 100 to cease operating in the difference mode of operation.

FIG. 2E and FIG. 2F illustrate operations of the PUF circuitry 100 in the sensing mode of operation. As illustrated in FIG. 2E, the third control signal 154 is de-asserted, namely, switched from the second logical value, such as the logical one, to the first logical value, such as the logical zero. In the exemplary embodiment illustrated in FIG. 2E, the de-assertion of the third control signal 154 activates, namely, turns-on, the PMOS transistor Q9 and the NMOS transistor Q10 to activate the sense amplifier 106. As described above in FIG. 1, the sense amplifier 106, when activated, stores the logical values indicating whether the first voltage V1 at the circuit node A is greater than or less than the second voltage V2 at the circuit node B. In the exemplary embodiment illustrated in FIG. 2E, the sense amplifier 106 writes the first logical value, namely the logical zero, to the circuit node A and the second logical value, namely, the logical one, to the circuit node B, when the first voltage V1 at the circuit node A is less than the second voltage V2 at the circuit node B. Otherwise, the sense amplifier 106 writes the second logical value, namely the logical one, to the circuit node A and the first logical value, namely, the logical zero, to the circuit node B, when the first voltage V1 at the circuit node A is greater than the second voltage V2 at the circuit node B.

As illustrated in FIG. 2F, the clocking signal 158 is transitioned from the first logical value, such as the logical zero, to the second logical value, such as the logical one, to activated the storage circuit 110. The storage circuit 110, when activated, reads the logical values stored within the sense amplifier 106 to provide the PUF output 156 indicating whether the PMOS transistor Q1 or the PMOS transistor Q2 has a faster speed, namely, is stronger as described above in FIG. 1.

Figure 3:
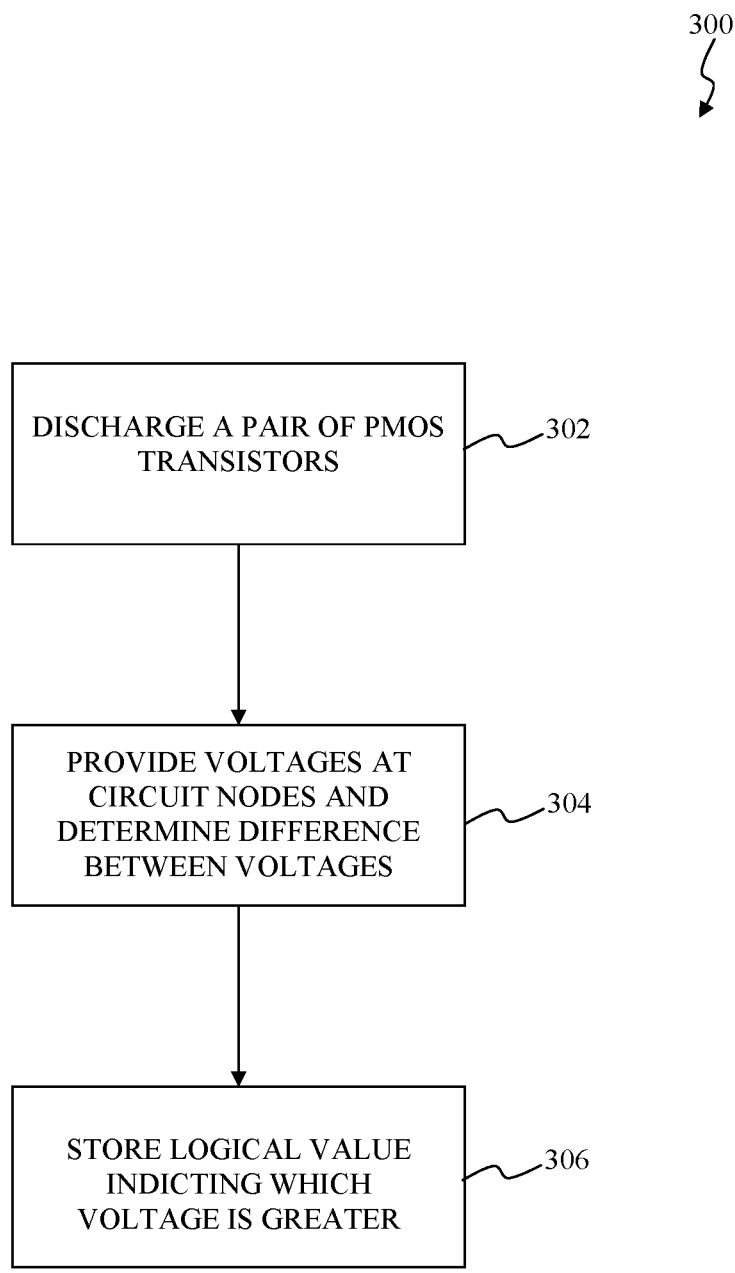
FIG. 3 illustrates a flowchart of exemplary operations for the exemplary first physical unclonable function (PUF) circuitry according to an exemplary embodiment of the present disclosure.

Exemplary Operational Control Flow for the First Physical Unclonable Function (PUF) Circuitry FIG. 3 illustrates a flowchart of exemplary operations for the exemplary first physical unclonable function (PUF) circuitry according to an exemplary embodiment of the present disclosure. The disclosure is not limited to this operational description. Other operational control flows are within the scope and spirit of the present disclosure. The following discussion describes an exemplary operational control flow 300 for a first physical unclonable function (PUF) circuitry, such as the PUF circuitry 100 as described above in FIG. 1, to implement a physical unclonable function (PUF).

At operation 302, the exemplary operational control flow 300 operates in a pre-discharge mode of operation to discharge a pair of transistors within the first PUF circuitry, such as the PMOS transistor Q1 and the PMOS transistor Q2 as described above in FIG. 1. The exemplary operational control flow 300 discharges a first voltage V1 at the circuit node A and a second voltage V2 at the circuit node B to be the first logical value, such as the logical zero.

At operation 304, the exemplary operational control flow 300 operates in a difference mode of operation. In the difference mode of operation, the pair of transistors, when activated, source drain-to-source currents ($I_{DS}$) from a voltage source $V_{CC}$ to begin to provide a first voltage V1 at the circuit node A and a second voltage V2 at the circuit node B, respectively. As described above, the magnitude of the first voltage V1 at the circuit node A and the magnitude of the second voltage V2 at the circuit node B at an instance in time depend up the speed of the transistors from among the pair of transistors. For example, the magnitude of the first voltage V1 at the circuit node A at the instance in time is greater than the magnitude of the second voltage V2 at the circuit node B the instance in time when a first transistor from among the pair of transistors has a faster speed, namely, is stronger, than a second transistor from among the pair of transistors. As another example, the magnitude of the first voltage V1 at the circuit node A the instance in time is less than the magnitude of the second voltage V2 at the circuit node B the instance in time when the first transistor has a slower speed, namely, is weaker, than the second transistor.

At operation 306, the exemplary operational control flow 300 operates in a sensing mode of operation. In the sensing mode of operation, a sense amplifier within the first PUF circuitry, when activated, stores the logical values indicating whether the first voltage V1 at the circuit node A is greater than or less than the second voltage V2 at the circuit node B. The sense amplifier writes the first logical value, namely the logical zero, to the circuit node A and the second logical value, namely, the logical one, to the circuit node B, when the first voltage V1 at the circuit node A is less than the second voltage V2 at the circuit node B. Otherwise, the sense amplifier writes the second logical value, namely the logical one, to the circuit node A and the first logical value, namely, the logical zero, to the circuit node B, when the first voltage V1 at the circuit node A is greater than the second voltage V2 at the circuit node B.

Exemplary Second Physical Unclonable Function (PUF) Circuitry

Figure 4:
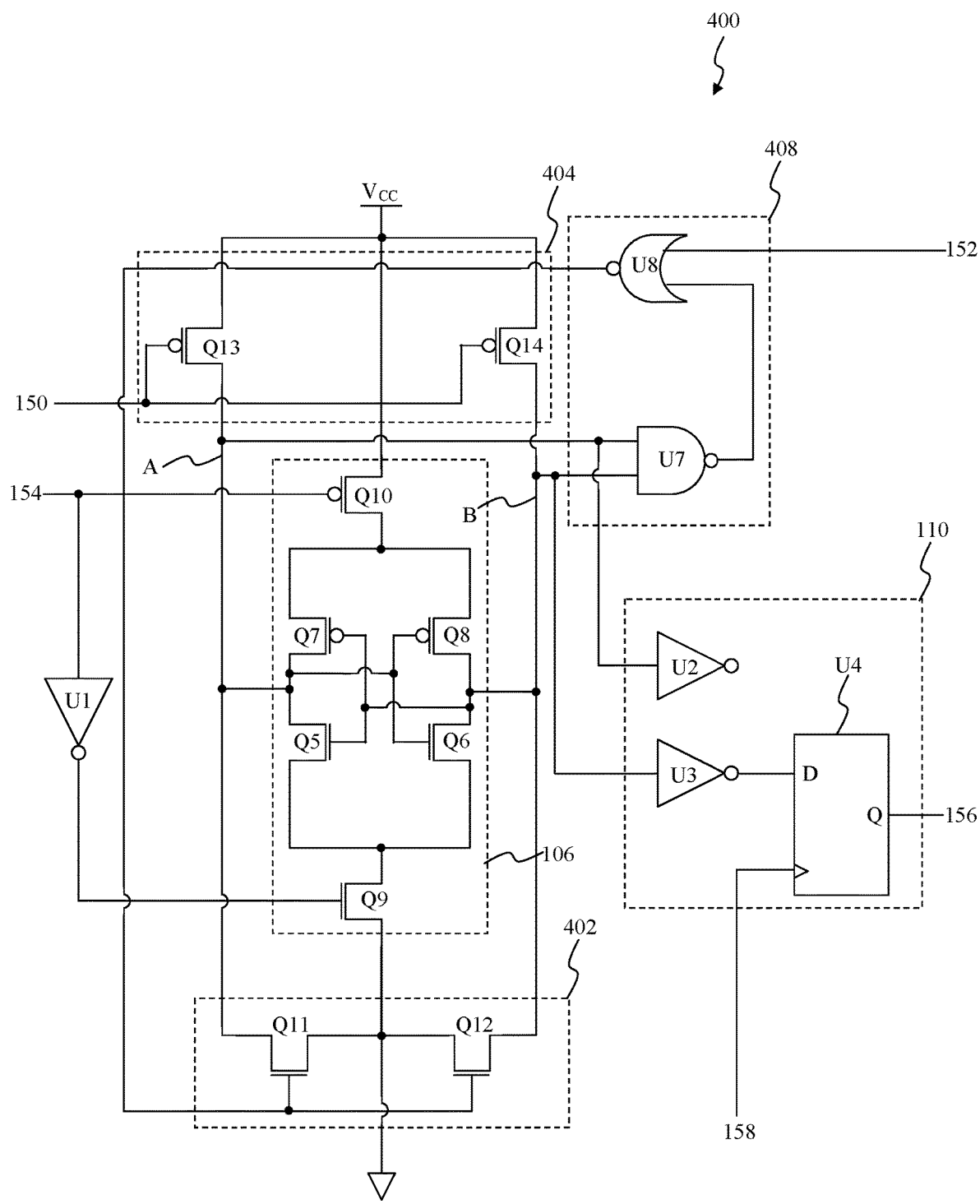
FIG. 4 illustrates a block diagram of second physical unclonable function (PUF) circuitry according to an exemplary embodiment of the present disclosure.

FIG. 4 illustrates a block diagram of second physical unclonable function (PUF) circuitry according to an exemplary embodiment of the present disclosure. In the exemplary embodiment illustrated in FIG. 4, PUF circuitry 400 can be fabricated using a semiconductor fabrication process having manufacturing variations and/or misalignment tolerances as described above in FIG. 1. As described in further detail below, these small differences can cause transistors of the PUF circuitry 400 to have different threshold voltages as described above in FIG. 1. The PUF circuitry 400 can use these different threshold voltages to quantify its physical uniqueness to differentiate itself from other PUF circuitry similarly designed and fabricated by the semiconductor fabrication process. As illustrated in FIG. 4, the PUF circuitry 400 includes the sense amplifier 106, the storage circuit 110, the logical INVERTER gate U1, a difference generator circuit 402, a pre-charge circuit 404, and a self-timed timing circuit 408. The sense amplifier 106, the storage circuit 110, and the logical INVERTER gate U1 are described above in FIG. 1.

In the exemplary embodiment illustrated in FIG. 4, the difference generator circuit 402 includes an n-type metal-oxide-semiconductor (NMOS) transistor Q11 and a NMOS transistor Q12. The uncontrollable random physical processes in the semiconductor fabrication process as described above can cause the doping concentrations, oxide thicknesses, channel lengths, structural widths, and/or parasitics to provide some examples to differ between the NMOS transistor Q11 and the NMOS transistor Q12. These differences can cause differences between threshold voltages of the NMOS transistor Q11 and the NMOS transistor Q12. For example, these differences can cause a first threshold voltage ($V_T$) of the NMOS transistor Q11 to be greater than a second $V_T$ of the NMOS transistor Q12. In this example, the greater first $V_T$ needed to activate, or turn-on, the NMOS transistor Q11 results in a slower relative speed for the NMOS transistor Q11 to activate, or turn-on, when compared to the NMOS transistor Q12. As a result, NMOS transistor Q11 can be characterized as being weaker when compared to the NMOS transistor Q12. As another example, these differences can cause the first $V_T$ of the NMOS transistor Q11 to be less than the second $V_T$ of the NMOS transistor Q12. In this example, the lesser first $V_T$ of the NMOS transistor Q11 results in a faster relative speed for the NMOS transistor Q11 to activate, or turn-on, when compared to the NMOS transistor Q12. As a result, the NMOS transistor Q11 can be characterized as being stronger when compared to the NMOS transistor Q12.

The pre-charge circuit 404, when activated, charges the difference generator circuit 402 to be the second logical value, such as a logical one. For example, the pre-charge circuit 404 charges parasitic capacitances of the NMOS transistor Q11, the NMOS transistor Q12, and/or signal pathways between the difference generator circuit 402 and the pre-charge circuit 404. In the exemplary embodiment illustrated in FIG. 4, the pre-charge circuit 404 includes a p-type metal-oxide-semiconductor (PMOS) transistor Q13 and an PMOS transistor Q14. As illustrated in FIG. 4, the PMOS transistor Q13, when activated in response to the first control signal 150 being the first logical value, such as a logical zero, charges the parasitic capacitances of the NMOS transistor Q11 and/or a signal pathway between the NMOS transistor Q11 and the PMOS transistor Q13. Similarly, the PMOS transistor Q14, when activated in response to the first control signal 150 being at the first logical value, charges the parasitic capacitances of the NMOS transistor Q12 and/or a signal pathway between the NMOS transistor Q12 and the PMOS transistor Q14 such at a first voltage V1 at the circuit node A and a second voltage V2 at the circuit node B are at the second logical value, such as the logical one.

The self-timed timing circuit 408 controls charging and discharging of the NMOS transistor Q11 or the NMOS transistor Q12. In the exemplary embodiment illustrated in FIG. 4, the self-timed timing circuit 408 includes a logical NAND gate U7 and a logical NOR gate U8. Other logical gates, such as one or more logical AND gates, one or more logical OR gates, one or more logical INVERTER gates, one or more logical NAND gates, one or more logical NOR gates, and/or one or more logical XOR gates to provide some examples, can be used to implement the self-timed timing circuit 408 without departing from the spirit and scope of the present disclosure.

In the exemplary embodiment illustrated in FIG. 4, the NMOS transistor Q11 and the NMOS transistor Q12 charge to cause decreasing voltages at a circuit node A and a circuit node B, respectively, as described above. In this exemplary embodiment, the logical NAND gate U7 provides the first logical value, such as the logical zero, when the voltage at the circuit node A and the voltage at the circuit node B are sufficient to trigger the logical NAND gate U7, for example, are at the second logical value, such as the logical one. Otherwise, the logical NAND gate U7 provides the second logical value, such as the logical one, when the voltage at the circuit node A or the voltage at the circuit node B are insufficient to trigger the logical NAND gate U7, for example, are at the first logical value, such as the logical zero. In the exemplary embodiment illustrated in FIG. 4, the logical NAND gate U7 provides the first logical value, such as the logical zero, when the logical value associated with the circuit node A and the logical value associated with the circuit node B are at the second logical value, such as the logical one. Otherwise, the logical NAND gate U7 provides the second logical value, such as the logical one, when the logical value associated with the circuit node A and/or the logical value associated with the circuit node B are at the first logical value, such as the logical zero. The logical NOR gate U8 provides the second logical value, such as the logical one, to activate the NMOS transistor Q11 and the NMOS transistor Q12 when an output of the logical NAND gate U7 and a second control signal 152 are at the first logical value, such as the logical zero. Otherwise, the logical NOR gate U8 provides the first logical value, such as the logical zero, to deactivate the NMOS transistor Q11 and the NMOS transistor Q12 when the output of the logical NAND gate U7 and the second control signal 152 are at the second logical value, such as the logical one.

Figure 5A:
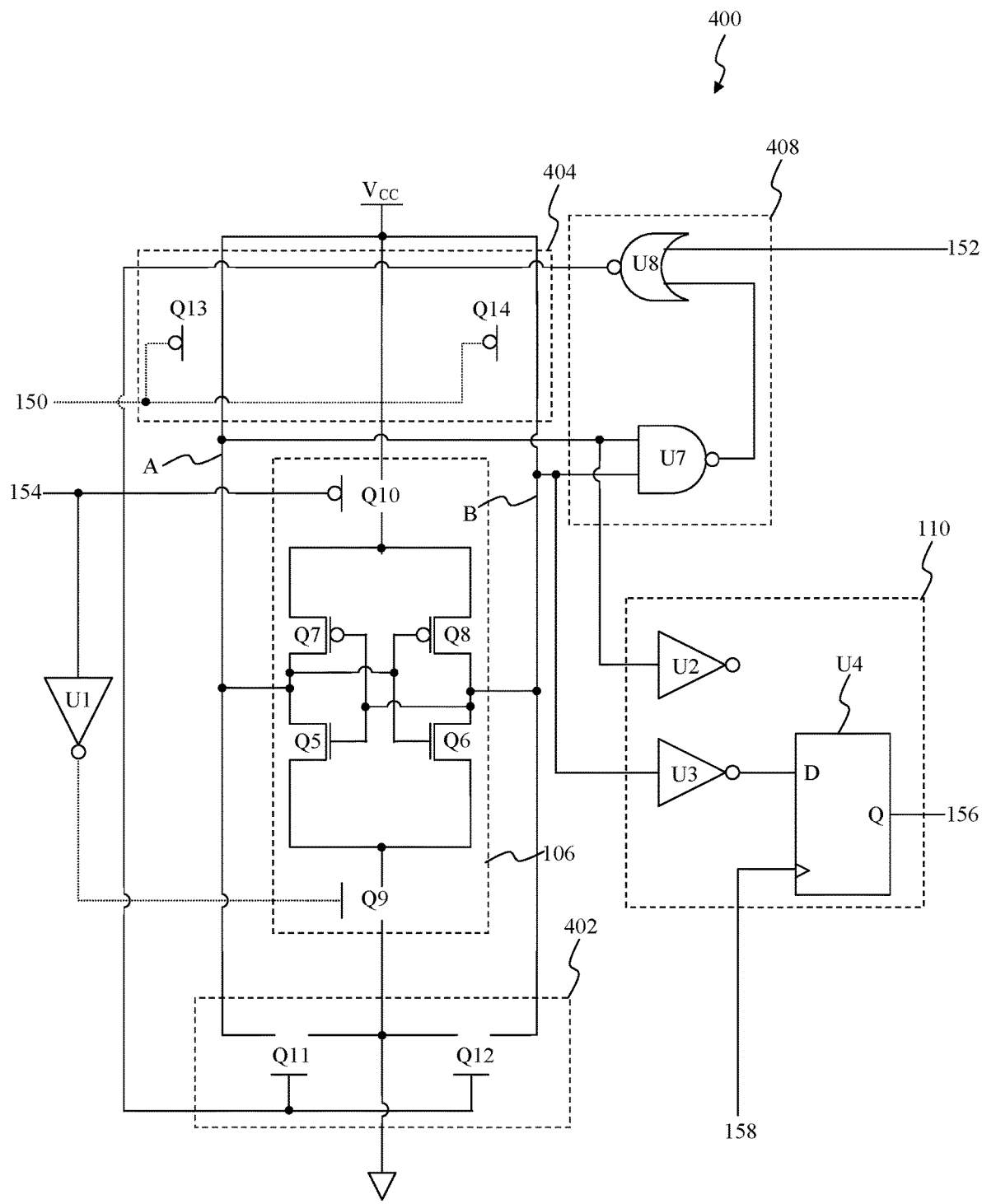
FIG. 5A through FIG. 5F illustrate exemplary operations of the second physical unclonable function (PUF) circuitry according to an exemplary embodiment of the present disclosure.
Figure 5B:
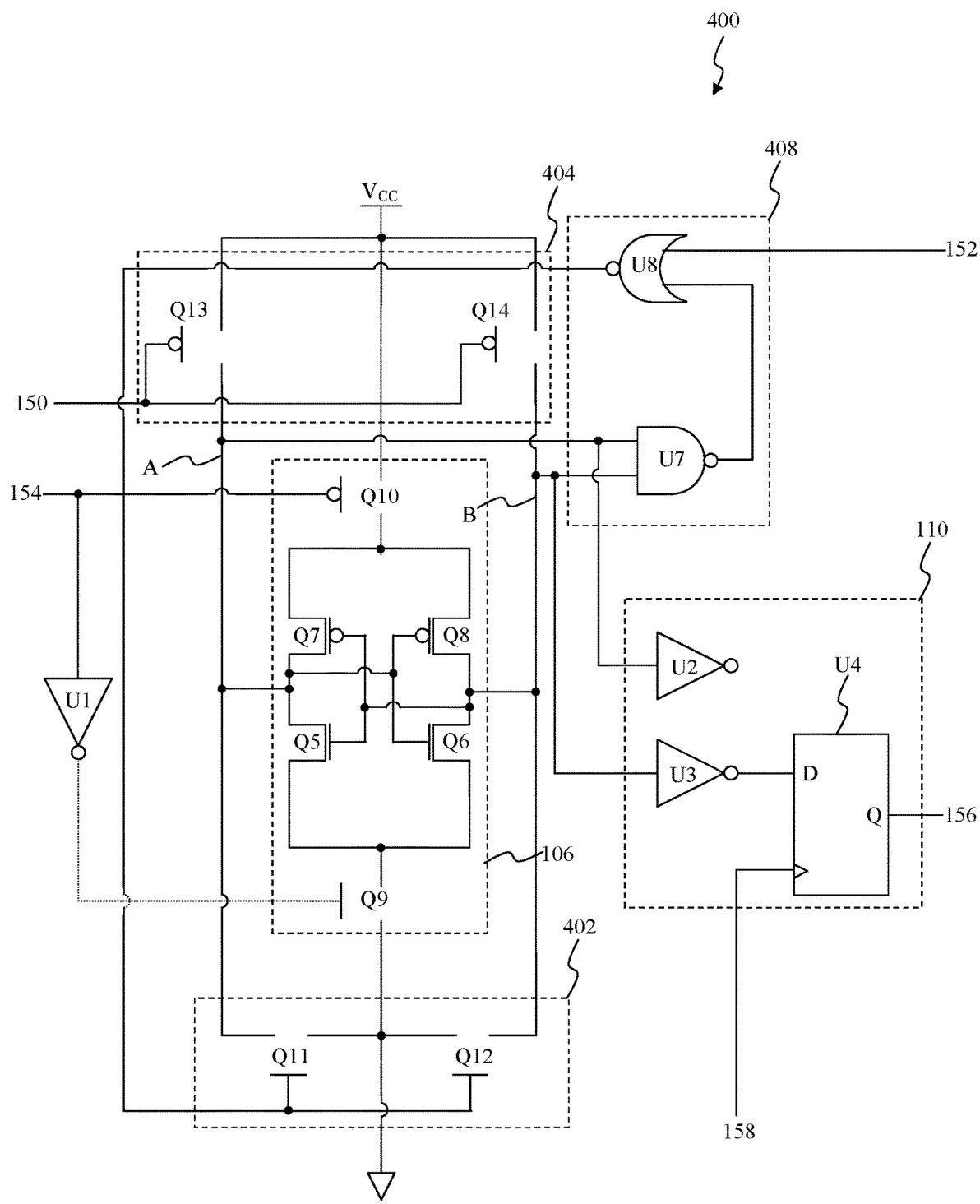
Figure 5C:
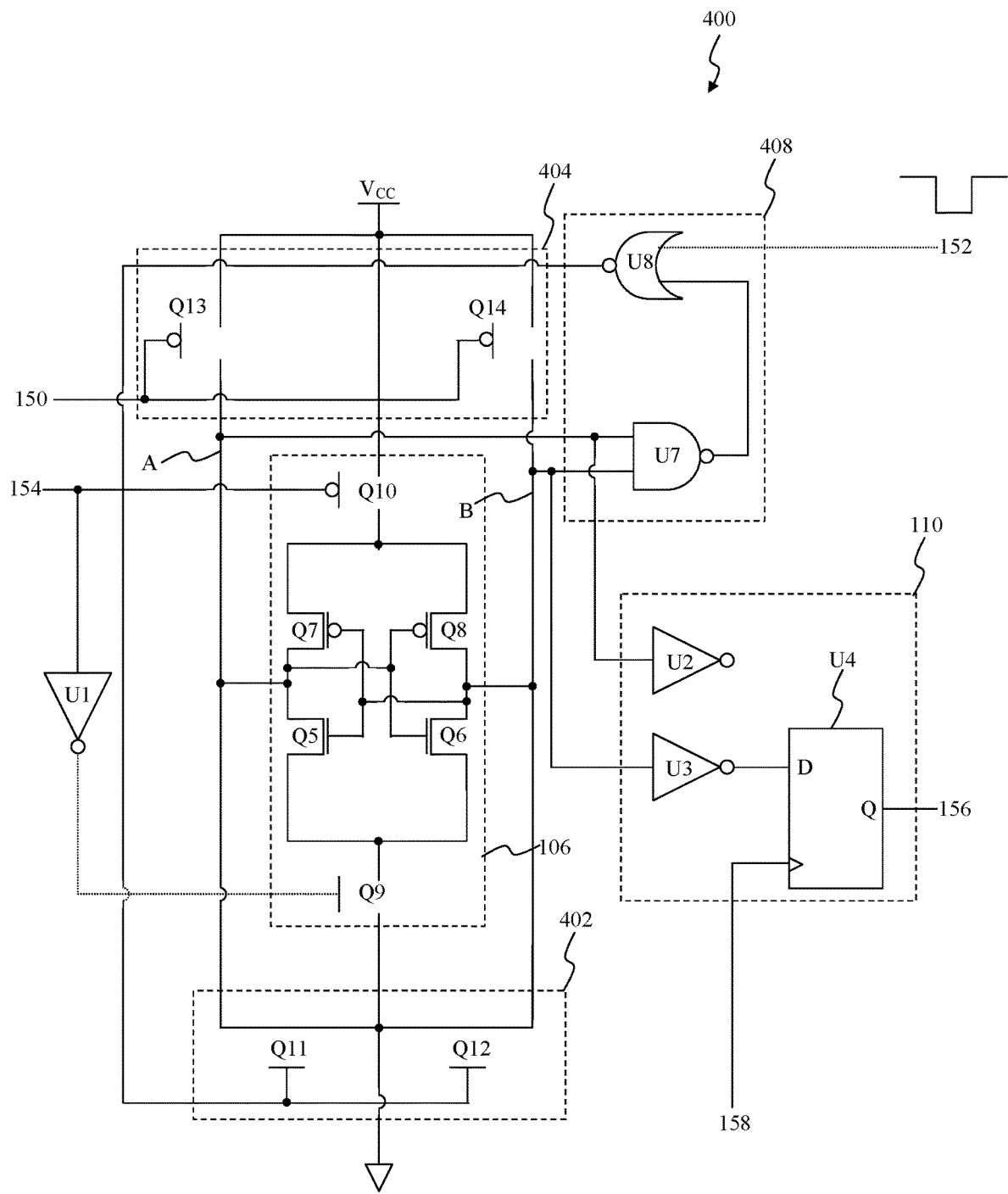
Figure 5D:
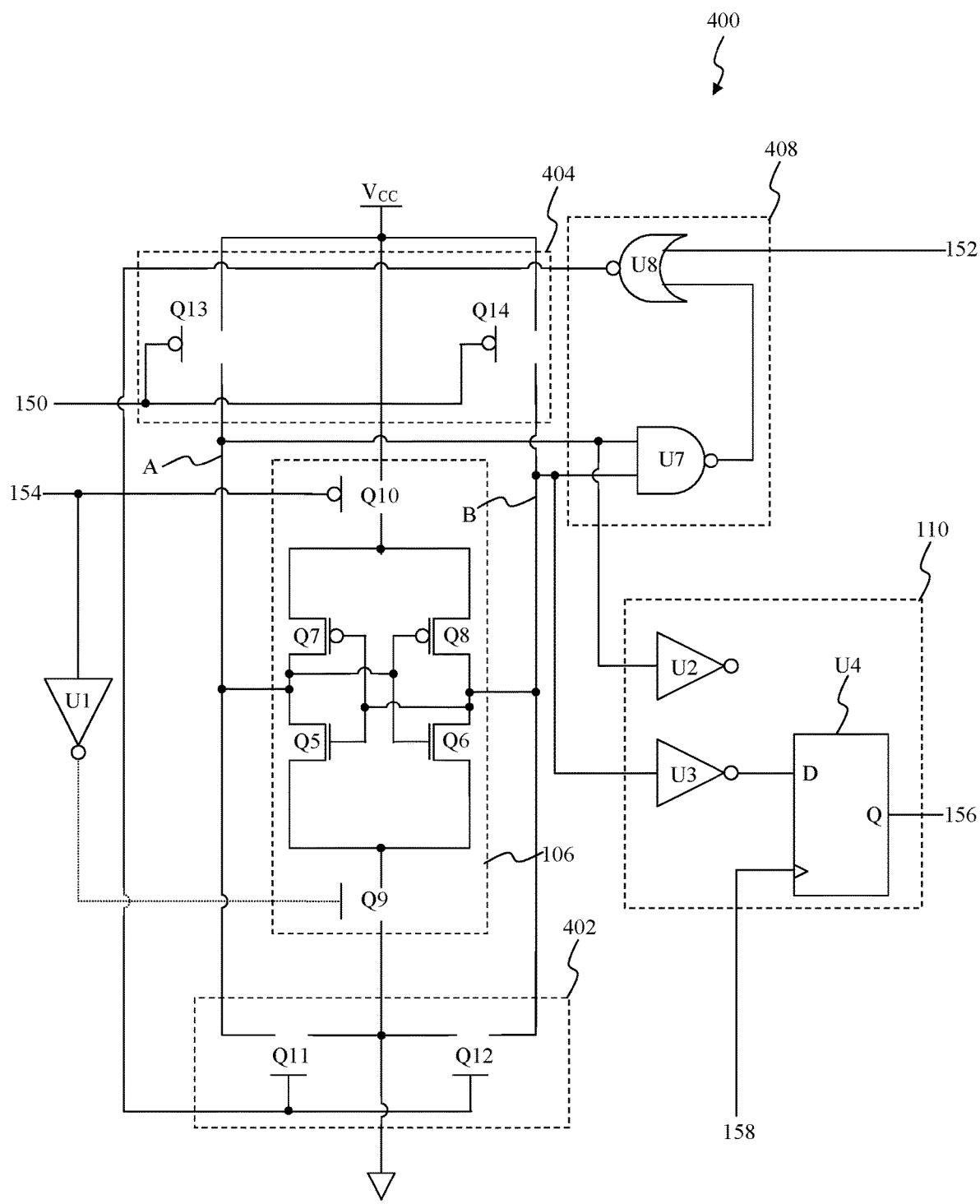
Figure 5E:
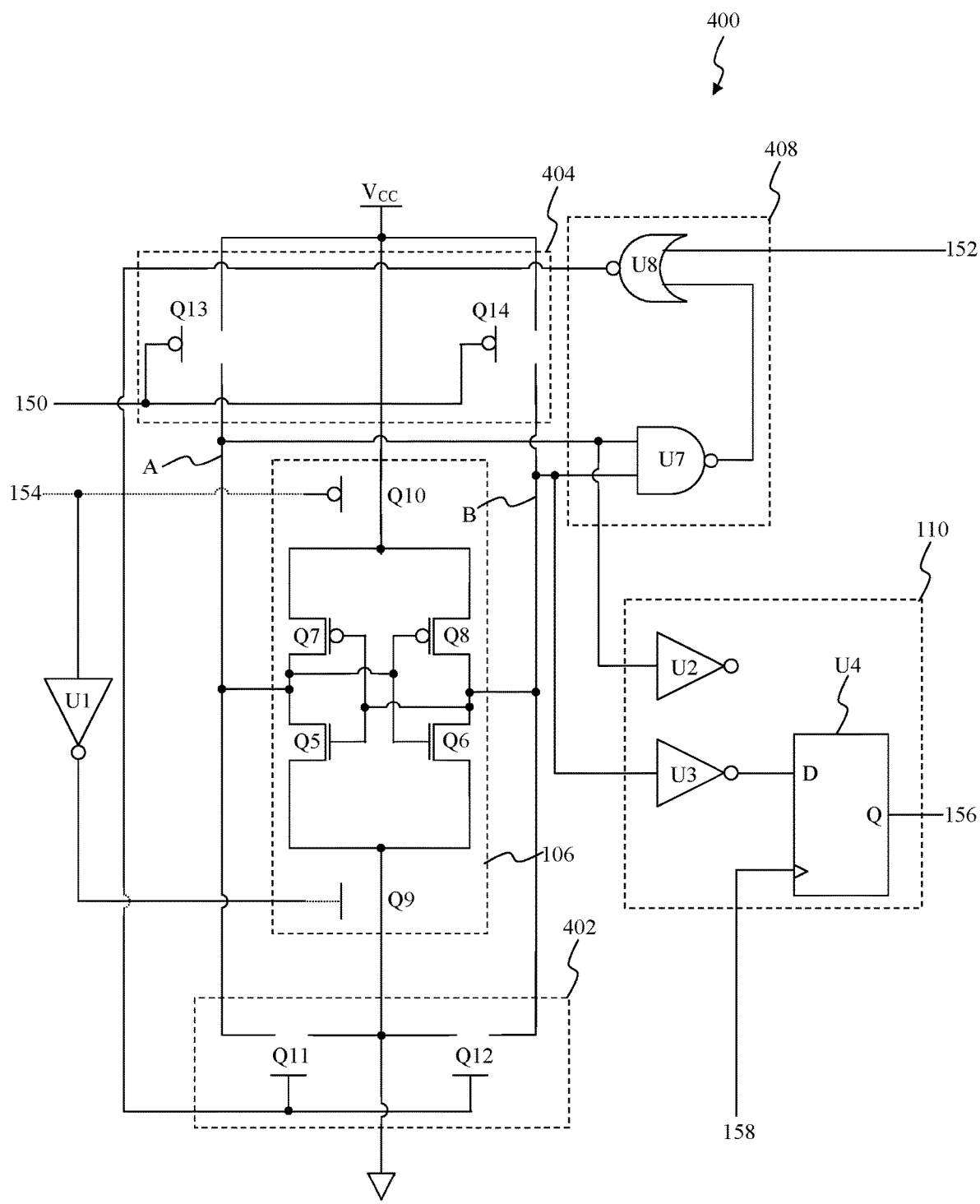
Figure 5F:
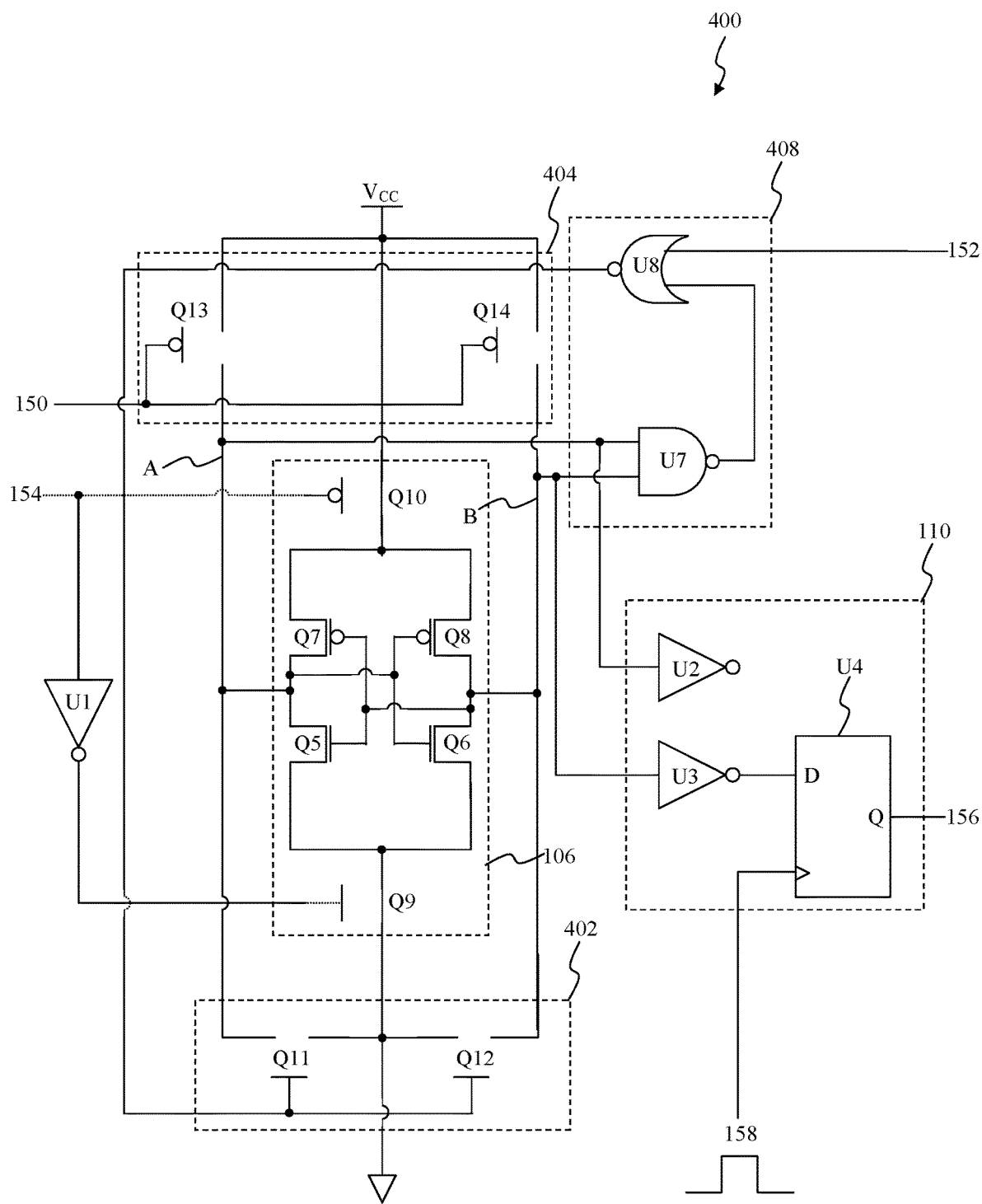

FIG. 5A through FIG. 5F illustrate exemplary operations of the second physical unclonable function (PUF) circuitry according to an exemplary embodiment of the present disclosure. As described in further detail below, the first control signal 150, the second control signal 152, and the third control signal 154 can be asserted, namely, switched from the first logical value, such as the logical zero, to the second logical value, such as the logical one, in various combinations to configure the PUF circuitry 400 to operate in different modes of operation. As described in further detail below, these modes of operation include a pre-charge mode of operation as illustrated in FIG. 5A and FIG. 5B, a difference mode of operation as illustrated in FIG. 5C and FIG. 5D, and a sensing mode of operation as illustrated in FIG. 5E through FIG. 5F. Moreover, active transistors are shown having their sources and drains connected in FIG. 5A through FIG. 5F while inactive transistors are shown having no connection between their sources and drains in FIG. 5A through FIG. 5F. Additionally, logical values of the first control line 150, the second control line 152, and the third control signal 154, which are described in further detail below, are indicted in FIG. 5A through FIG. 5F. As described in further detail below, a dotted line represents these control signals being at the first logical value, such as the logical zero, while a solid line represents these control lines being at the second logical value, such as the logical one.

FIG. 5A and FIG. 5B illustrate operations of the PUF circuitry 400 in the pre-charge mode of operation. As illustrated in FIG. 5A, the first control signal 150 is de-asserted, namely, switched from the second logical value, such as the logical one, to the first logical value, such as the logical zero. The second control signal 152 and the third control signal 154 remain at the second logical value, such as the logical one, to configure the PUF circuitry 400 to operate in the pre-charge mode of operation. In the exemplary embodiment illustrated in FIG. 4, the de-assertion of the first control signal 150 activates, namely, turns-on, the PMOS transistor Q3 and the PMOS transistor Q4 to charge parasitic capacitances of the NMOS transistor Q11, the NMOS transistor Q12, and/or signal pathways between the difference generator circuit 402 and the pre-charge circuit 404 such at a first voltage V1 at the circuit node A and a second voltage V2 at the circuit node B are at the second logical value, such as the logical one.

As illustrated in FIG. 5B, the first control signal 150 is asserted, namely, switched from the first logical value, such as the logical zero, to the second logical value, such as the logical one, to deactivate, namely, turn-off, the PMOS transistor Q3 and the PMOS transistor Q4 to configure the PUF circuitry 400 to cease operating in the pre-charge mode of operation.

FIG. 5C and FIG. 5D illustrate operations of the PUF circuitry 400 in the difference mode of operation. As illustrated in FIG. 5C, the second control signal 152 is de-asserted, namely, switched from the second logical value, such as the logical one, to the first logical value, such as the logical zero to configure the PUF circuitry 400 to operate in the difference mode of operation. In an exemplary embodiment illustrated in FIG. 5C, a clocking signal can be used as the second control signal 152. In the exemplary embodiment illustrated in FIG. 5C, the de-assertion of the second control signal 152 activates, namely, turns-on, the NMOS transistor Q11 and the NMOS transistor Q12. The NMOS transistor Q11 and the NMOS transistor Q12, when activated, sink drain-to-source currents ($I_{DS}$) from the first voltage V1 at the circuit node A and the second voltage V2 at the circuit node B, respectively, to the ground potential. As described above, the magnitude of the first voltage V1 at the circuit node A and the magnitude of the second voltage V2 at the circuit node B at an instance in time depend up the speed of the NMOS transistor Q11 and the NMOS transistor Q12, respectively. For example, the magnitude of the first voltage V1 at the circuit node A at the instance in time is less than the magnitude of the second voltage V2 at the circuit node B the instance in time when the NMOS transistor Q11 has a slower speed, namely, is weaker, than the NMOS transistor Q12. As another example, the magnitude of the first voltage V1 at the circuit node A the instance in time is greater than the magnitude of the second voltage V2 at the circuit node B the instance in time when the NMOS transistor Q11 has a faster speed, namely, is stronger, than the NMOS transistor Q12. As illustrated in FIG. 5D, the first voltage V1 at the circuit node A and the second voltage V2 at the circuit node B decrease until the first voltage V1 at the circuit node A and/or the second voltage V2 at the circuit node B falls to a sufficient magnitude, referred to as the trigger voltage, to activate the self-timed timing circuit 408. In the exemplary embodiment illustrated in FIG. 5D, the trigger voltage can represent a threshold voltage of the logical NAND gate U7, an average of the first logical value and the second logical value, and/or any other suitable value.

As illustrated in FIG. 5D, the self-timed timing circuit 408, when activated, deactivates, namely, turns-off, the NMOS transistor Q11 and the NMOS transistor Q12. As described above in FIG. 4, the logical NAND gate U7 provides the second logical value, such as the logical one, when the first voltage V1 at the circuit node A and/or second voltage V2 at the circuit node B are less than or equal to the trigger voltage. The logical NOR gate U8 provides the first logical value, such as the logical one, to deactivate the NMOS transistor Q11 and the NMOS transistor Q12 when the logical NAND gate U7 provides the second logical value, such as the logical one, to configure the PUF circuitry 400 to cease operating in the difference mode of operation.

FIG. 5E and FIG. 5F illustrate operations of the PUF circuitry 400 in the sensing mode of operation. As illustrated in FIG. 5E, the third control signal 154 is de-asserted, namely, switched from the second logical value, such as the logical one, to the first logical value, such as the logical zero. In the exemplary embodiment illustrated in FIG. 5E, the de-assertion of the third control signal 154 activates, namely, turns-on, the PMOS transistor Q9 and the NMOS transistor Q10 to activate the sense amplifier 106. As described above in FIG. 1, the sense amplifier 106, when activated, stores the logical values indicating whether the first voltage V1 at the circuit node A is greater than or less than the second voltage V2 at the circuit node B. In the exemplary embodiment illustrated in FIG. 5E, the sense amplifier 106 writes the first logical value, namely the logical zero, to the circuit node A and the second logical value, namely, the logical one, to the circuit node B, when the first voltage V1 at the circuit node A is less than the second voltage V2 at the circuit node B. Otherwise, the sense amplifier 106 writes the second logical value, namely the logical one, to the circuit node A and the first logical value, namely, the logical zero, to the circuit node B, when the first voltage V1 at the circuit node A is greater than the second voltage V2 at the circuit node B.

As illustrated in FIG. 5F, the clocking signal 158 is transitioned from the first logical value, such as the logical zero, to the second logical value, such as the logical one, to activated the storage circuit 110. The storage circuit 110, when activated, reads the logical values stored within the sense amplifier 106 to provide the PUF output 156 indicating whether the NMOS transistor Q11 or the NMOS transistor Q12 has a faster speed, namely, is stronger as described above in FIG. 4.

Figure 6:
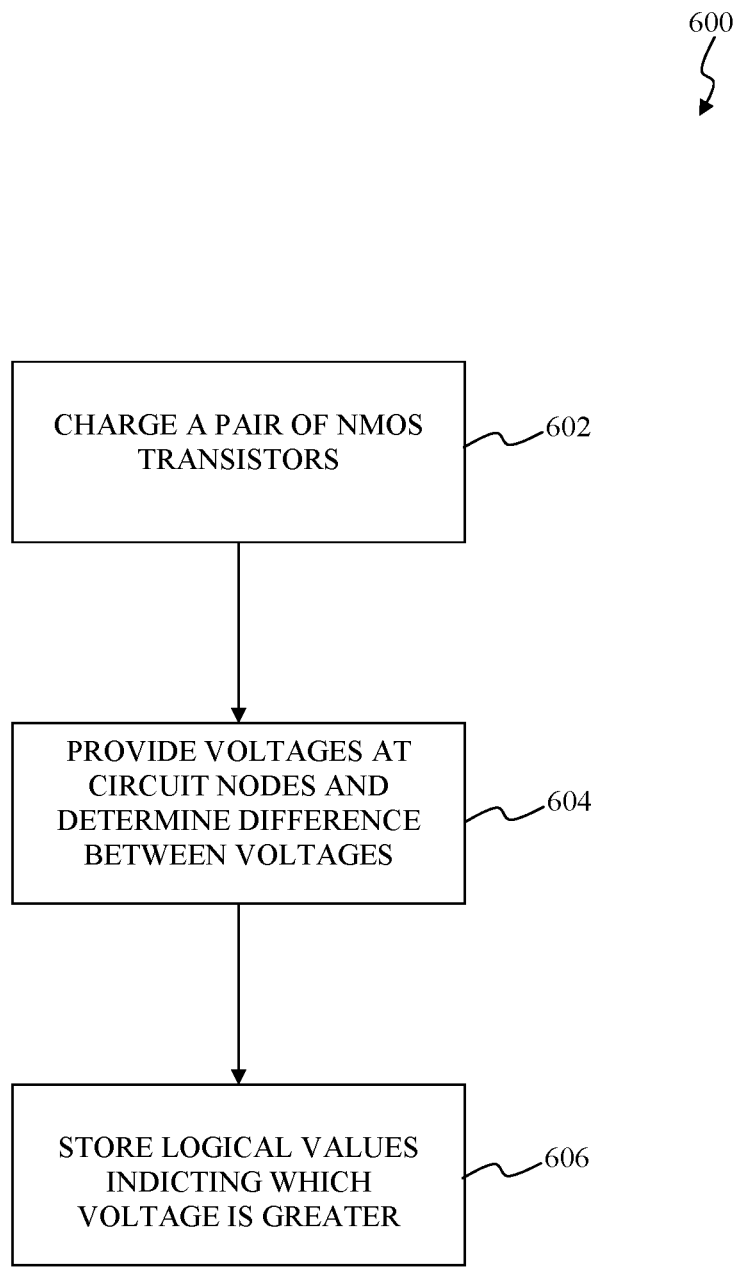
FIG. 6 illustrates a flowchart of exemplary operations for the exemplary second physical unclonable function (PUF) circuitry according to an exemplary embodiment of the present disclosure.

Exemplary Operational Control Flow for the Second Physical Unclonable Function (PUF) Circuitry FIG. 6 illustrates a flowchart of exemplary operations for the exemplary second physical unclonable function (PUF) circuitry according to an exemplary embodiment of the present disclosure. The disclosure is not limited to this operational description. Other operational control flows are within the scope and spirit of the present disclosure. The following discussion describes an exemplary operational control flow 600 for a second physical unclonable function (PUF) circuitry, such as the PUF circuitry 400 as described above in FIG. 4, to implement a physical unclonable function (PUF).

At operation 602, the exemplary operational control flow 600 operates in a pre-charge mode of operation to charge a pair of transistors within the second PUF circuitry, such as the NMOS transistor Q11 and the NMOS transistor Q12 as described above in FIG. 4. The exemplary operational control flow 600 charges a first voltage V1 at the circuit node A and a second voltage V2 at the circuit node B to be the second logical value, such as the logical one.

At operation 604, the exemplary operational control flow 600 operates in a difference mode of operation. In the difference mode of operation, the pair of transistors, when activated, source drain-to-source currents ($I_{DS}$) from the first voltage V1 at the circuit node A and a second voltage V2 at the circuit node B, respectively. As described above, the magnitude of the first voltage V1 at the circuit node A and the magnitude of the second voltage V2 at the circuit node B at an instance in time depend up the speed of the transistors from among the pair of transistors. For example, the magnitude of the first voltage V1 at the circuit node A at the instance in time is greater than the magnitude of the second voltage V2 at the circuit node B the instance in time when a first transistor from among the pair of transistors has a slower speed, namely, is weaker, than a second transistor from among the pair of transistors. As another example, the magnitude of the first voltage V1 at the circuit node A the instance in time is less than the magnitude of the second voltage V2 at the circuit node B the instance in time when the first transistor has a faster speed, namely, is stronger, than the second transistor.

At operation 606, the exemplary operational control flow 600 operates in a sensing mode of operation. In the sensing mode of operation, a sense amplifier within the second PUF circuitry, when activated, stores the logical values indicating whether the first voltage V1 at the circuit node A is greater than or less than the second voltage V2 at the circuit node B. The sense amplifier writes the first logical value, namely the logical zero, to the circuit node A and the second logical value, namely, the logical one, to the circuit node B, when the first voltage V1 at the circuit node A is less than the second voltage V2 at the circuit node B. Otherwise, the sense amplifier writes the second logical value, namely the logical one, to the circuit node A and the first logical value, namely, the logical zero, to the circuit node B, when the first voltage V1 at the circuit node A is greater than the second voltage V2 at the circuit node B.

Figure 7:
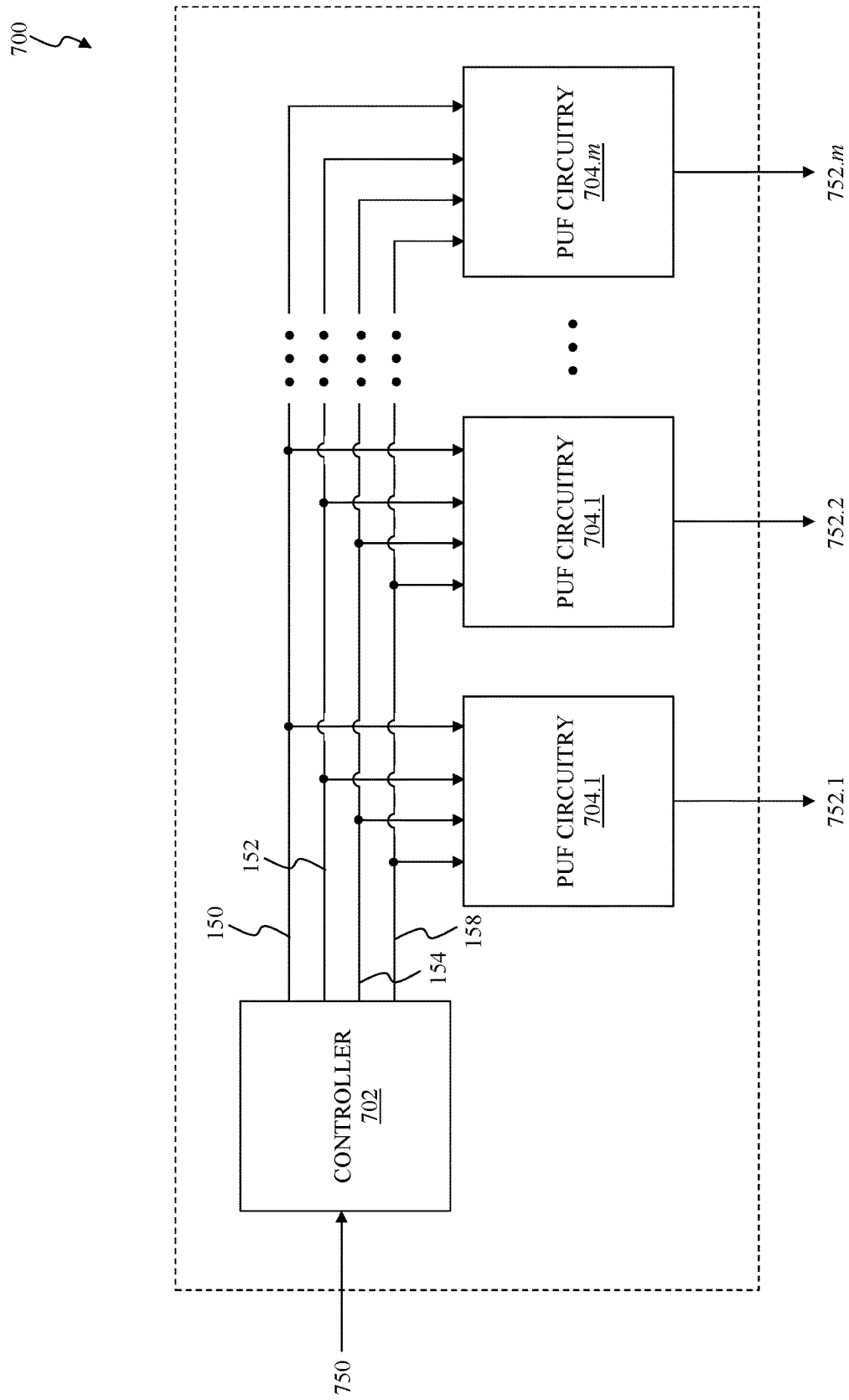
FIG. 7 illustrates a block diagram of an exemplary electronic device having exemplary physical unclonable function (PUF) circuitry according to an exemplary embodiment of the present disclosure.

Exemplary Electronic Device Having Exemplary Physical Unclonable Function (PUF) Circuitry FIG. 7 illustrates a block diagram of an exemplary electronic device having exemplary physical unclonable function (PUF) circuitry according to an exemplary embodiment of the present disclosure. As illustrated in FIG. 7, electronic circuitry 700 can be fabricated using a semiconductor fabrication process. Often times, manufacturing variations and/or misalignment tolerances present within the semiconductor fabrication process can cause the electronic circuitry 700 to differ from other electronic circuitry similarly designed and fabricated by the semiconductor fabrication process as described above in FIG. 1. As described in further detail below, the electronic circuitry 700 utilizes a physical unclonable function (PUF) to differentiate the electronic circuitry 700 from other electronic circuitry similarly designed and fabricated by the semiconductor fabrication process. As illustrated in FIG. 7, the electronic circuitry 700 includes a controller 702 and PUF circuitries 704.1 through 704.m.

In the exemplary embodiment illustrated in FIG. 7, the PUF circuitries 704.1 through 704.m can be utilized to provide an electronic signature for the electronic circuitry 700 to differentiate the electronic circuitry 700 from other electronic circuitry similarly designed and fabricated by the semiconductor fabrication process. The electronic circuitry 700 as illustrated in FIG. 7 can be implemented as a standalone or a discrete device or may be incorporated within or coupled to another electrical device or host device such as a mobile telephone, a portable computing device, another computing device such as a personal, a laptop, or a desktop computer, a computer peripheral such as a printer, a portable audio and/or video player, a household appliance and/or any other suitable electronic device. When incorporated within or coupled to this other electrical device or host device, the electronic circuitry 700 can be utilized to provide an electronic signature for this other electrical device or host device to differentiate this other electrical device or host device from other electrical devices or host devices similarly designed and fabricated by the semiconductor fabrication process.

As illustrated in FIG. 7, the controller 702 receives a challenge 750 for the electronic signature for the electronic circuitry 700. When the controller 702 is presented with the challenge 750, the electronic circuitry 700 generates an m-bit response 752.1 through 752.m that depends on the physical properties of the electronic circuitry 700 as described above. In the exemplary embodiment illustrated in FIG. 7, the controller 702 provides the first control signal 150, the second control signal 152, the third control signal 154, and the clocking signal 158 to cause the PUF circuitries 704.1 through 704.m to provide the m-bit response 752.1 through 752.m. For the purposes of this discussion, the controller 702 can include a microprocessor, a digital signal processor (DSP), or other hardware processor. The controller 702 can be "hard-coded" with instructions to perform corresponding function(s) according to embodiments described herein. Alternatively, the controller 702 can access an internal and/or external memory to retrieve instructions stored in the memory, which when executed by the controller 702, perform the corresponding function(s) associated with the controller 702. The PUF circuitries 704.1 through 704.m provides the m-bit response 752.1 through 752.m in response to the first control signal 150, the second control signal 152, the third control signal 154, and the clocking signal 158. The PUF circuitries 704.1 through 704.m can be implemented using the PUF circuitry 100 as described above in FIG. 1 through FIG. 3, the PUF circuitry 400 as described above in FIG. 4 through FIG. 6, and/or any combination thereof.

CONCLUSION

The foregoing Detailed Description discloses a physical unclonable function (PUF) circuitry including a difference generator circuit having a first p-type metal-oxide-semiconductor (PMOS) transistor and a second PMOS transistor, a self-timed timing circuit, and a sense amplifier. The first PMOS transistor and the second PMOS transistor source a first current to provide an increasing first voltage at a first circuit node and a second current to provide an increasing second voltage at a second circuit node, respectively. The self-timed timing circuit causes the first PMOS transistor and the second PMOS transistor to cease to source the first current and the second current, respectively, in response to the increasing first voltage or the increasing second voltage rising to a trigger voltage to trigger the self-timed timing circuit. The sense amplifier stores a logical value indicating whether the first voltage at is greater than or less than the second voltage in response to the increasing first voltage or the increasing second voltage rising to the trigger voltage.

The foregoing Detailed Description also discloses another physical unclonable function (PUF) circuitry including a difference generator circuit having a first n-type metal-oxide-semiconductor (NMOS) transistor and a second NMOS transistor, a self-timed timing circuit, and a sense amplifier. The first NMOS transistor and the second NMOS transistor sink a first current to provide a decreasing first voltage at a first circuit node and a second current to provide a decreasing second voltage at a second circuit node, respectively. The self-timed timing circuit causes the first NMOS transistor and the second NMOS transistor to cease to sink the first current and the second current, respectively, in response to the decreasing first voltage or the decreasing second voltage falling to a trigger voltage to trigger the self-timed timing circuit. The sense amplifier stores a logical value indicating whether the first voltage at is greater than or less than the second voltage in response to the decreasing first voltage or the decreasing second voltage rising to the trigger voltage.

The foregoing Detailed Description further discloses a method for determining an electronic signature of an electronic device. The method includes receiving a challenge for the electronic signature, storing a first logical value indicating a first transistor of the electronic device is faster than a second transistor of the electronic device or a second logical value indicating the first transistor is slower than the second transistor, and providing the first logical value or the second logical value as a corresponding bit from among a plurality of bits of the electronic signature.

The foregoing Detailed Description outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. Physical unclonable function (PUF) circuitry, comprising:
    a difference generator circuit having a first p-type metal-oxide-semiconductor (PMOS) transistor and a second PMOS transistor, the first PMOS transistor and the second PMOS transistor being configured to source a first current to provide an increasing first voltage at a first circuit node and a second current to provide an increasing second voltage at a second circuit node, respectively;
    a self-timed timing circuit configured to cause the first PMOS transistor and the second PMOS transistor to cease to source the first current and the second current, respectively, in response to the increasing first voltage or the increasing second voltage rising to a trigger voltage to trigger the self-timed timing circuit; and
    a sense amplifier configured to store a logical value indicating whether the first voltage is greater than or less than the second voltage in response to the increasing first voltage or the increasing second voltage rising to the trigger voltage.

2. The PUF circuitry of claim 1, further comprising:
    a pre-discharge circuit configured to discharge the first circuit node and the second circuit node to a logical zero.

3. The PUF circuitry of claim 1, further comprising:
    a storage circuit configured to store the logical value.

4. The PUF circuitry of claim 1, wherein the self-timed timing circuit comprises:
    a logical gate configured to be triggered in response to the increasing first voltage or the increasing second voltage rising to the trigger voltage.

5. The PUF circuitry of claim 4, wherein the logical gate comprises:
    a logical NOR gate.

6. The PUF circuitry of claim 1, wherein the first PMOS transistor is characterized as having a faster speed when compared to the second PMOS transistor,
    wherein the increasing first voltage at the first circuit node rises to the trigger voltage faster than the increasing second voltage at the second circuit node, and
    wherein the sense amplifier is configured to store a logical one as the logical value indicating the increasing first voltage at the first circuit node is greater than the increasing second voltage at the second circuit node.

7. The PUF circuitry of claim 1, wherein the first PMOS transistor is characterized as having a slower speed when compared to the second PMOS transistor,
    wherein the increasing first voltage at the first circuit node rises to the trigger voltage slower than the increasing second voltage at the second circuit node, and
    wherein the sense amplifier is configured to store a logical zero as the logical value indicating the increasing first voltage at the first circuit node is less than the increasing second voltage at the second circuit node.

8. Physical unclonable function (PUF) circuitry, comprising:
    a difference generator circuit having a first n-type metal-oxide-semiconductor (NMOS) transistor and a second NMOS transistor, the first NMOS transistor and the second NMOS transistor being configured to sink a first current to provide a decreasing first voltage at a first circuit node and a second current to provide a decreasing second voltage at a second circuit node, respectively;
    a self-timed timing circuit configured to cause the first NMOS transistor and the second NMOS transistor to cease to sink the first current and the second current, respectively, in response to the decreasing first voltage or the decreasing second voltage falling to a trigger voltage to trigger the self-timed timing circuit; and
    a sense amplifier configured to store a logical value indicating whether the first voltage is greater than or less than the second voltage in response to the decreasing first voltage or the decreasing second voltage falling to the trigger voltage.

9. The PUF circuitry of claim 8, further comprising:
    a pre-charge circuit configured to charge the first circuit node and the second circuit node to a logical one.

10. The PUF circuitry of claim 8, further comprising:
    a storage circuit configured to store the logical value.

11. The PUF circuitry of claim 8, wherein the self-timed timing circuit comprises:
    a logical gate configured to be triggered in response to the decreasing first voltage or the decreasing second voltage falling to the trigger voltage.

12. The PUF circuitry of claim 11, wherein the logical gate comprises:
    a logical NAND gate.

13. The PUF circuitry of claim 8, wherein the first NMOS transistor is characterized as having a faster speed when compared to the second NMOS transistor,
    wherein the decreasing first voltage at the first circuit node falls to the trigger voltage faster than the decreasing second voltage at the second circuit node, and
    wherein the sense amplifier is configured to store a logical one as the logical value indicating the decreasing first voltage at the first circuit node is less than the decreasing second voltage at the second circuit node.

14. The PUF circuitry of claim 8, wherein the first NMOS transistor is characterized as having a slower speed when compared to the second NMOS transistor, wherein the decreasing first voltage at the first circuit node falls to the trigger voltage slower than the decreasing second voltage at the second circuit node, and wherein the sense amplifier is configured to store a logical zero as the logical value indicating the decreasing first voltage at the first circuit node is greater than the decreasing second voltage at the second circuit node.

15. A method for determining an electronic signature of an electronic device, the method comprising:

receiving a challenge for the electronic signature;

sourcing, by a first p-type metal-oxide-semiconductor (PMOS) transistor of the electronic device and a second PMOS transistor of the electronic device, a first current to provide an increasing first voltage at a first circuit node of the electronic device and a second current to provide an increasing second voltage at a second circuit node of the electronic device, respectively;

storing a first logical value indicating the first PMOS transistor is faster than the second PMOS transistor in response to the first voltage at the first circuit node rising to a trigger voltage before the second voltage at the second circuit node;

storing a second logical value indicating the first PMOS transistor is slower than the second PMOS transistor in response to the first voltage at the first circuit node rising to the trigger voltage after the second voltage at the second circuit node; and providing the first logical value or the second logical value as a corresponding bit from among a plurality of bits of the electronic signature.

16. The method of claim 15, further comprising:

causing the first PMOS transistor and the second PMOS transistor to cease to source the first current and the second current, respectively, in response to the increasing first voltage or the increasing second voltage rising to the trigger voltage.

17. A method for determining an electronic signature of an electronic device, the method comprising:

receiving a challenge for the electronic signature;

sinking a first current to provide a decreasing first voltage at a first circuit node of the electronic device and a second current to provide a decreasing second voltage at a second circuit node of the electronic device, respectively;

storing a first logical value indicating a first n-type metal-oxide-semiconductor (NMOS) transistor of the electronic device is faster than a second NMOS transistor of the electronic device in response to the first voltage at the first circuit node falling to a trigger voltage before the second voltage at the second circuit node;

storing a second logical value indicating the first NMOS transistor is slower than the second NMOS transistor in response to the first voltage at the first circuit node falling to the trigger voltage after the second voltage at the second circuit node; and providing the first logical value or the second logical value as a corresponding bit from among a plurality of bits of the electronic signature.

18. The method of claim 17, further comprising:

causing the first NMOS transistor and the second NMOS transistor to cease to sink the first current and the second current, respectively, in response to the decreasing first voltage or the decreasing second voltage falling to the trigger voltage.

* * * * *